United States Patent [19]
Ford

[11] Patent Number: 5,929,330
[45] Date of Patent: Jul. 27, 1999

[54] VISUAL TIRE CAP PRESSURE INDICATOR

[76] Inventor: Robert P. Ford, 2 Thunder Cove Pl., The Woodlands, Tex. 77381

[21] Appl. No.: 09/067,686

[22] Filed: Apr. 28, 1998

Related U.S. Application Data

[63] Continuation-in-part of application No. 08/971,175, Nov. 14, 1997.
[51] Int. Cl.[6] .............................. B01C 23/04; G01L 7/16; G01L 7/04
[52] U.S. Cl. .............................. 73/146.8; 73/715; 73/744
[58] Field of Search .................................... 73/146.8, 715, 73/744

[56] References Cited

U.S. PATENT DOCUMENTS 4,116,157  9/1978  Evans ........................................ 116/125

*Primary Examiner*—Joseph L. Felber
*Attorney, Agent, or Firm*—Robert W. Strozier; J. M.(Mark) Gilbreth; Gilbreth & Strozier, P.C.

[57] ABSTRACT

A pressure gauge for a pressurized device is disclosed that provides a simple, efficient and highly visual indication of pressure change from a normal condition to various abnormal conditions. The pressure gauge includes a chamber, a pressure converter located within or operably associated with the chamber, a rotary member coupled to the converter and having an indicator pattern and a cap including at least one window through which at least a portion of the indicator pattern is viewable. Once the gauge is brought into fluid communication with a pressurized device, then the cap may be rotated or adjusted to align the windows with a desired marker type placing the gauge in a normal or first indicator data. A change in pressure in the chamber will cause the gauge to undergo a change to a new or different indicator state.

20 Claims, 15 Drawing Sheets

VISUAL TIRE CAP PRESSURE INDICATOR

RELATED APPLICATIONS

This application is a continuation-in-part of application Ser. No. 08/971,175 which was filed on Nov. 14, 1997.

BACKGROUND OF THE INVENTION

1. Field of the Invention

This invention relates to a simplified measuring device that provides a continuous visual indication of the current pressure range of a pneumatic tire or other pressurized device, container or vessel.

More particularly, the present invention relates to a pressure measuring assembly that is brought into fluid (air) communication with the interior pressure in a pressurized or pneumatic device and indicates pressure changes in the pressurized or pneumatic device by inducing a change from a first indicator state to a different indicator state evidenced by a change in pattern and/or color of the measuring assembly.

2. Description of Related Art

Maintaining the proper air pressure in pneumatic vehicle tires is critical for the safe and efficient operation of the tire as well as the vehicle as a whole. If such a tire is operated at air pressures above or below its recommended design pressure, the likely effects include; (1) substantially shortened life expectancy of the tires; (2) dangerous impairment to road traction and steering control required for safe vehicle operation; and (3) reduced overall vehicle fuel and mechanical efficiency.

It is clear that the effects of improperly maintained tire pressure can lead to loss of vehicle control (potential fatalities, injuries and property loss) and a significant increase in on-going vehicle operating expense (tires, fuel, etc.).

The proper maintenance of tire pressure has and continues to be an unsolved problem for the vast majority of vehicle owners and operators. Manually checking the pressure of each tire on a regular basis is both a nuisance and inconvenience to the average vehicle operator. The increase in popularity of "self-service" gas stations and the reluctance of service station attendants to "check the tires" only exacerbate this problem. This results in the majority of vehicle tires going unchecked, typically until abnormal tire wear is observed or vehicle handling becomes noticeably impaired.

As evidence of the long-felt need of the motoring public for a solution to this problem, one need only review the number of patents claiming to address this expensive and potentially dangerous situation. Numerous devices have been proposed and patented for providing a continuous and visible indication of tire operating pressure. Most of the prior art designs either replace the standard tire valve stem or are a replacement for the original valve cap (utilizing the existing standard valve stem). Given that the vast majority of car or truck owners would more readily replace a tire valve cap than a tire valve stem, attention will be directed towards the former. A partial list of United States Patents for devices for monitoring tire pressure are: U.S. Pat. Nos. 5,641,902; 5,569,849; 5,557,256; 5,115,832; 5,007,365; 4,819,686; 4,606,391; 4,464,929; 4,174,673; 4,116,157, 4,103,549, and U.S. Pat. No. 3,889,530.

Certain features appear to be critical for a commercially viable design: (1) minimize material fatigue and subsequent component failure; (2) minimize the effect or consequences of seal leakage or blow-by; (3) minimize the number of components, their costs and manufacturing complexity; (4) maximize the visual indication of the current operating conditions and the sensitivity to pressure changes; and (5) minimize the size and weight to be aesthetically pleasing and to not adversely affect the wheel's balance.

All prior art can be graded and ranked on their attempts to satisfy these fundamental design criteria. A careful review of the prior art, documents various techniques implemented to attain low complexity and high reliability. However when judged on the basis of balancing the delivery of high functionality (usability) within the constraints of a very small form factor, all the prior art falls significantly short of the goal. The following examples and discussion will highlight the difficulties of achieving an appropriate balance between functionality, reliability and aesthetically pleasing packaging.

Numerous references of prior art, (U.S. Pat. No. 5,007, 365 for example) describe a pressurized chamber and piston which has been biased with a spring to movably respond to changes in operating pressure. This design when utilized in a continuously indicating device, subjects the piston seals to a constant pressure gradient under harsh environmental conditions. These environmental conditions include temperature extremes, moisture and other contaminates introduced by compressed air sources, and extreme pressure excursions as when the tire strikes a curb or other tire deforming obstruction. These environmental factors are particularly hazardous to seals and their ability to prevent leakage or blow-by, and thus compromise the integrity of the pressure measurement.

Alternatively to pistons and seals, U.S. Pat. No. 4,606,391 discloses a design incorporating the use of a flexible diaphragm to transmit pressure conditions between the tire and tire cap gauge. Two different configurations of diaphragms are noted in the prior art. One configuration allows for air pressure on the tire side of the diaphragm to stretch and elastically deform the diaphragm relative to the ambient pressure on the cap side of the diaphragm. The tire pressure acting on the diaphragm causes a displacement in the axial direction that is proportional to the pressure differential and this displacement is converted into a visual indication. While the inherent piston and seal disadvantages described previously are mostly overcome, this technique continually loads the diaphragm elastically, and given the likelihood of pressure spikes as noted previously, it significantly increases the probability of material fatigue or failure. The second method of incorporating flexible diaphragms while similar in configuration to the first, does not load the diaphragm elastically (in fact the diaphragm may be totally inelastic). Although the loosely fitting flexible diaphragm does hermetically divide the pressure chamber and allows for the transmission of pressure differential forces, it does so without putting a continuous elastic load on the diaphragm material. This technique overcomes many of the previously noted disadvantages of the elastically loaded diaphragm and requires much less precision construction and expense to produce than the sealed piston described earlier.

The ability of a device to deliver a continuous and highly visible indication of pressure change is critical to meeting consumer expectations. Designs that only marginally support this requirement will not be perceived as useful or convenient by the public regardless of the device's other technical merits. U.S. Pat. No. 4,819,686 discloses a tire cap design that while technically sound (its diaphragm is subjected to only the pressure differential between actual tire pressure and an initially set reference pressure) it only marginally meets the visual notification requirement. This and other prior art disclosures have positioned the visual indication to be most readily viewed from the end of the cap (apex or top). These designs neglect the fact that on most tires it is the sides of the cap that represent the predominant viewable surface.

U.S. Pat. No. 5,007,365 is a good example of the tradeoff inherent between visual sensitivity and device size or complexity. In this design, the tube body and spring constant must be sized to allow a sufficient displacement of the piston to provide a discernable visual pressure indication. For linear springs, this generally results in longer spring lengths to achieve the pressure change sensitivity capable of being visually detected. These spring lengths require longer tube bodies that critically lack esthetical appeal. Other designs require the vehicle operator to be positioned in very close proximity to the tire gauge (i.e., squat down or bent over) in order to discern the current pressure condition. These designs will simply not meet the ease of use and convenience requirement that the public expects.

It is evident that the prior art has failed to disclose a successful design for a purely mechanical device that is capable of displaying a highly visual indication of tire pressure in a very small form factor. While all prior art claim to satisfy one or more of the aforementioned design criteria, no prior art has been able to broadly satisfy all of them to the reasonable satisfaction of a manufacturer or the consumer. Thus, due to the lack of any significant commercial success of any previously patented design, it is clear that a highly functional, cost effective and easy to use device has yet to be disclosed.

In response to the numerous disadvantages of the prior art, the present invention is disclosed incorporating a new and novel visual indication feature without sacrificing any of the aforementioned design criteria.

SUMMARY OF THE INVENTION

The present invention provides a pressure gauge including a chamber and an actuating member designed to place the chamber into fluid communication with a pneumatic device. The gauge includes a flexible membrane hermetically sealing the chamber. The gauge also includes a cam member having a helical groove that cooperates with a movable indicator member having at least one marker region associated therewith where the marker region(s) is designed to evidence a change in pressure through a change in indicator state. The gauge further includes a bias member interposed between the cam and the movable indicator.

The gauge additionally includes a rotatable cap having a plurality of masking windows associated therewith. Once the gauge is brought into fluid communication with the pneumatic device, the cap can be rotated to align the masking windows with a given marker on the indicator member placing the gauge in a normal or first indicator state. A change in the pressure in the chamber will cause the volume of the chamber to change which will cause the cam to move axially or to undergo an axial or vertical displacement which in turn causes the indicator member to rotate or to undergo an angular or rotatory displacement resulting in a new or different indicator state. Of course, the gauge can be designed such that the indicator has one or more different marker types so that the gauge can assume an equivalent number of pure states and a near infinite number of intermediate states as the gauge changes from one pure state to another pure state.

An alternate embodiment provides a pressure gauge including: (1) a cylindrical base; (2) a chamber; (3) optionally, an actuating member designed to place the chamber into fluid communication with a pressurized device; (4) a pressure converter which translates chamber pressure into angular displacement; (5) a rotary indicator member having at least one marker region preferably associated with an outer surface thereof; (6) a rotatable cap having a plurality of windows and masks associated therewith where the marker region(s) is designed to evidence a change in pressure through a visible change in indicator state.

Once the gauge is brought into fluid communication with the pressurized device, the cap can be rotated to align the windows with a given marker on the indicator member placing the gauge in a normal or first indicator state. A change in the pressure in the chamber is converted to an angular displacement that is directly communicated to the rotary indicator member resulting in a new or different indicator state. Of course, the gauge can be designed such that the indicator has one or more different marker types so that the gauge can assume an equivalent number of pure states and a near infinite number of intermediate states as the gauge changes from one pure state to another pure state.

The present invention also provides a method for reading a pressure of a pneumatic or pressurized device including reading an indicator state of a pressure measuring device as described above in fluid communication with the pneumatic or pressurized device.

The present invention also provides a method for attaching a pressure measuring device as described above to a pneumatic or pressurized device including bringing the pressure measuring device into fluid communication with an interior of the pneumatic or pressurized device so that the measuring device is exposed to a pressure in the interior of the pneumatic or pressurized device and adjusting the pressure measuring device so that the measuring device is in a normal or first indicator state.

BRIEF DESCRIPTION OF DRAWINGS

For a better understanding of the principles and nature of the present invention, references should be made to the following illustrative drawing where like elements may be identified with the same numerals.

DESCRIPTION OF THE PREFERRED EMBODIMENTS

Figure 1:
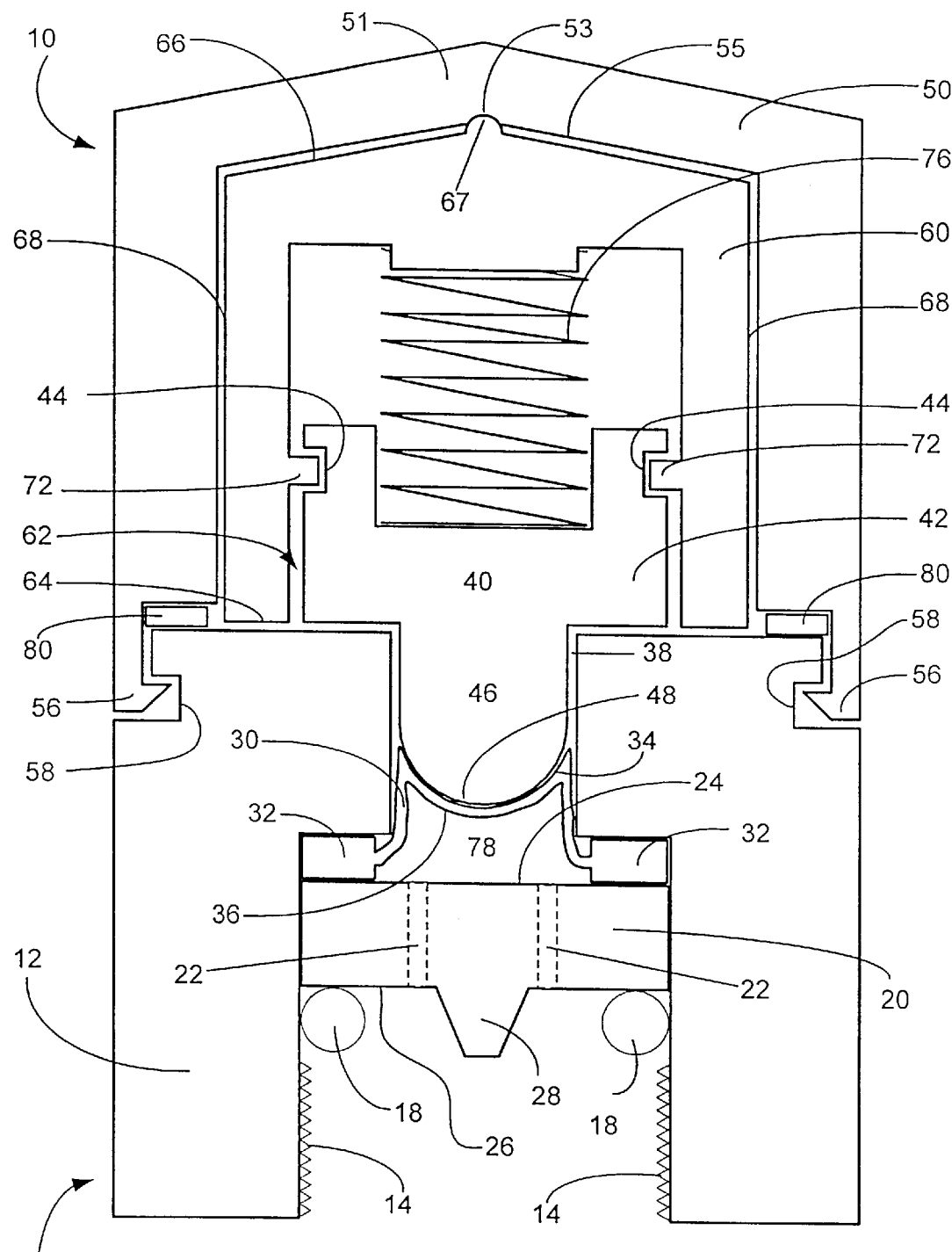
FIG. 1 is a cross-sectional view of a preferred embodiment of a gauge of the present invention.

The inventor has found that a pressure indicator can be constructed that overcomes the shortcomings of prior art devices and provides a high level of visual indication while satisfying the requirements for a safe, cost effective, functional, easy to use, and aesthetically pleasing device.

The gauge of the present invention has the following advantages: (1) it provides an easy to read or discern, continuous visual indication of current pressure of a pressurized or pneumatic device; (2) for tires, it is designed to replace standard tire valve stem caps; (3) it can indicate pressure ranges using multiple (two or more) colors and/or patterns such as one color or pattern for normal pressure, others to indicate a pressure above or below a desired pressure, others to indicate a pressure severely above or below a desired pressure; (4) it can be designed to effect non-linear response which acts to alter or increase the sensitivity to pressures changes over a working pressure range by modifying the geometry of a pressure to angular conversion means, such as helical grooves or channels of a cam member, twisted tube-like members, or helical tracks in a helical track member; (6) it incorporates a calibration feature allowing the gauge to be set to the normal or first indicator state; and (7) it is composed of a minimal number of easy to manufacture components minimizing production cost.

Preferably, the gauge of the present invention can include a base having a member for engaging a valve of a pressurized or pneumatic device such as a tire, optionally an actuating member for opening the valve and at least one aperture in the base through which fluid can flow. Preferably, the aperture is associated with the actuator. The gauge further includes a flexible membrane, such as a diaphragm, designed with the base to form a chamber which is in fluid communication with the pressurized or pneumatic device through the aperture in the base. The gauge also includes a movable cam having a helical groove or channel where a lower surface of the cam is in contact with an upper surface of the flexible member. The membrane not only hermetically seals the chamber from the upper portion of the gauge, but it also communicates the pressure forces acting on the membrane directly to a movable cam member adjacent to it.

Although the flexible member is preferable, the chamber can also be formed between the lower base and the bottom surface of the cam member, provided that the cam makes a hermetic or tight seal with the bore or base and is free to move axially (up and down) in response to a change in pressure in the pneumatic or pressurized device communicated to the chamber through the apertures. The cam includes a cylindrical body having one or more opposed helical grooves or channels therein and a contoured bottom surface designed to engage the upper surface of the flexible member. The grooves in the cam align and engage fixed tabs such that the cooperation of the tabs and the helical cam grooves result in angular displacement of the indicator.

The gauge further includes a movable or rotary indicator member having a plurality of marker regions associated with an outer surface thereof and a cap having a plurality of masks and windows where the markers regions and the masks and windows cooperated to produce a strongly visible indicator state. The gauge also includes a bias member, such as a simple mechanical spring or an elastomeric member, interposed between the moveable or rotary indicator member and the cam member where the bias member is preferably under compression.

The gauge includes a means to secure the flexible member and form an hermetic seal between the chamber (and the pneumatic or pressurized device) and internal gauge components which are at ambient pressure. The flexible member can be secured and sealed by an actuating member, or other retaining member, which is designed to removably engage the base.

The gauge operates by attaching it to a pressurized or pneumatic device, generally by threading the gauge onto a valve exit such as the threads of a tire valve stem. However, the gauge can be attached to the device using any other mechanism such as a quick connect device. When the gauge is securely attached to the pressurized or pneumatic device, the actuating member of the gauge opens a pressurized or pneumatic device valve and the gauge chamber is placed in fluid communication with the pressurized or pneumatic device through the aperture in the base. The pressurization of the chamber results in a force on the flexible membrane that is directly communicated to the adjacent cam. The cam being biased by the spring will not undergo an axial displacement until a magnitude of a force acting on the flexible member due to a pressure in the pressurized device is greater than the opposite or opposing force acting on the cam due to the bias member or spring. Once the bias force has been overcome, the cam and spring will be displaced until a new equilibrium condition is attained. The cap of the gauge is then adjusted, generally by rotating the cap, until the gauge is placed in a normal or first indicator state. Of course, this assumes that the pressure in the pressurized or pneumatic device is at its standard, normal or preferred pressure.

When the force acting on the flexible member is different from the spring bias force (as when the pressure in the chamber changes), the cam and the bias member will undergo an axial displacement until an new equilibrium condition is attained. The resultant axial displacement of the cam member is converted into an angular displacement of the indicator member (i.e., the indicator member rotates) changing the visual indicator state. Stated another way, the flexible membrane is designed to move in response to a change in a pressure in the chamber which in turn axially displaces the cam which in turn rotates the indicator relative to the cap and associated windows thus changing the indicator state.

Typically, the marker(s) or marker region(s) associated with the movable or rotary indicator member will be colored and/or patterned. The patterns can be geometrical or textual or a combination thereof. Additionally, the patterns can be mono-colored or multi-colored or combinations thereof. By adjusting (rotating) the cap, the windows will move relative to the indicator member, thus allowing the gauge to be set to a normal or first indicator state such as green, black, no pattern or color or the word "good". A change in pressure in the pneumatic device will result in a corresponding change in volume of the chamber. In cooperation with the bias member which is typically a mechanical device such as a spring, the volume change is communicated through the flexible membrane to the cam which in turn causes an angular displacement of the indicator (the indicator rotates). That is, a change in pressure in the pressurized or pneumatic device will result in an angular rotation of the indicator. The movement of the indicator relative to the windows causes a new pattern, color or both to appear through the windows in the cap visually evidencing the change in pressure.

The geometry of the indicator member maximizes the visual impact of the present invention. The patterns and/or colored markers are distributed axially as vertical stripes or bands associated with a cylindrical surface of the indicator member. The adjustable cap with associated masks and windows cooperates with the bands and their relative positions to produce a desired visual indicator state. With respect to the prior art, this unique and novel design provides the largest surface area to project a visual indication of pressure relative to the devices overall size. In addition to distributing the marker patterns along the cylindrical surface of the indicator, a top or end surface or a portion thereof of the indicator member can also include corresponding marker bands. It is this ability to maximize the visual response while maintaining an esthetically acceptable form-factor that sets the present invention apart from the prior art.

Referring now to FIG. 1, the present invention can be seen to be a gauge, generally as 10, including a tubular or cylindrical base 12 having internal threads 14 on a lower portion 16 thereof where the base 12 and threads 14 are designed to detactably engage threads of a tire valve stem (not shown). The base 12 may also include a suitable seal 18 designed to form a hermetic seal with the valve stem.

An actuator 20 is secured to the lower portion 16 of the base 12. Preferably, the actuator 20 is secured into the base 12 by the internal threads 14. The actuator 20 includes apertures 22 therethrough, a top surface 24, a bottom surface 26 and a valve depression member 28 designed to depress a valve in the tire stem permitting fluid communication between the interior of the tire pressure through the aperture 22.

The gauge 10 also includes a flexible membrane 30 secured and sealed in place by the actuator 20. The flexible membrane 30 is preferably composed of a resilient, fatigue resistant, air impermeable material such as an elastomeric material including, without limitation, a cured rubber formulation containing polyisobutylene or other similar air impermeable composition that are resilient and fatigue resistant. The flexible member 30 has a generally "script u" shape having an outside ring 32 for forming a seal between the top 24 of the actuator 20 and the base 12, an upper surface 34 and a lower surface 36.

Figure 2:
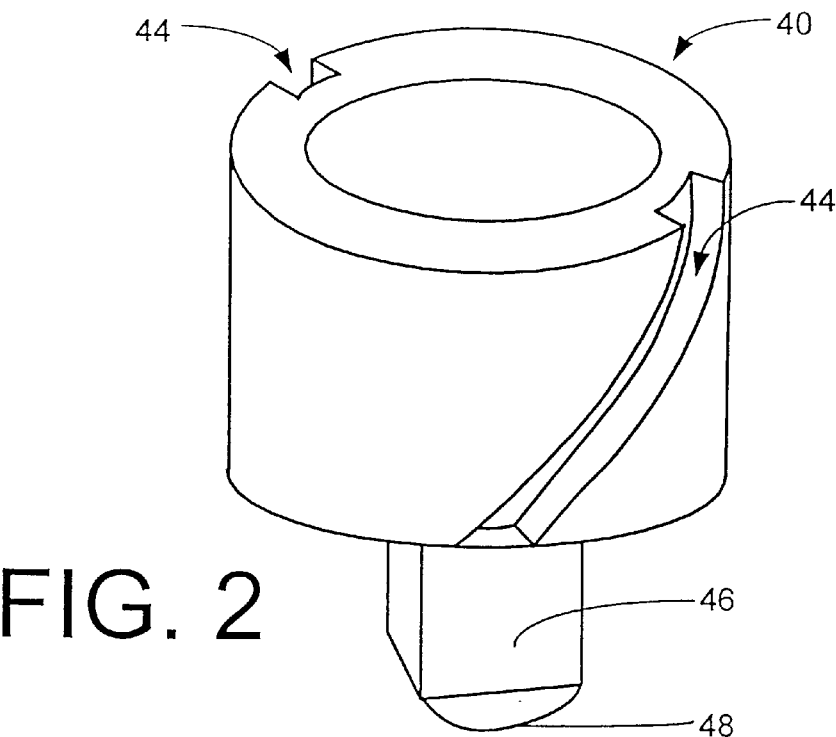
FIG. 2 is a perspective view of the cam of FIG. 1.

Referring to FIGS. 1 and 2, the base 12 also includes a square bore or aperture 38 into which the flexible member 30 extends and which is designed to receive a cam member 40. The cam 40 includes a cylindrical body 42 having two opposed helical grooves or channels 44 therein and a square shaft 46 having a contoured bottom surface 48 designed to engage the upper surface 34 of the flexible membrane 30. The shaft 46 is designed to slidingly engaged the bore 38 and although the shaft 46 and the bore 38 are shown to be square shaped, their actual shape can be any shape that prevents the shaft from rotating in the bore such as any other polygonal shape or a cylindrical shape with rotation barriers such as tabs and vertical grooves to prevent shaft rotation.

Moreover, the shaft 46 and the cylindrical body 42 can be integral (formed of one piece of material) or can be separate pieces that attachable engage each other so that the cam functions as a single unit. However, the attachment can be frictional and not mechanical if the bias member discussed below provide sufficient force to maintain frictional contact between the shaft and the body of the cam.

Referring back to FIGS. 1 and 4, the gauge 10 further includes an adjustable cylindrically shaped cap 50 having a plurality of windows 52 separated by a plurality of opaque masks 54 for viewing a indicator state of the gauge 10 during use and a conically shaped top 51. The cap 50 attaches to the base 12 by a mechanical coupling that allows the cap 50 to rotate. In FIG. 1, the cap 50 includes a lip 56 and the base 12 includes a lip receiving groove 58 so that the cap 50 snaps onto the base 12, yet the attachment permits the cap 50 to rotate relative to the base 12. The cap 50 also includes a pivoting indentation 53 in a lower surface 55 of the top 51. Preferably, the windows 52 and masks 54 extend up onto the top 51 or a portion thereof. The cap can be clear with the masks associated either with an interior or exterior surface of the cap or the cap can be constructed of clear and opaque stripes. The masks can be colored, patterned, textual inscribed or a combination thereof. In fact, the masks can be colored, patterned or textually inscribed with the same color, pattern or textual inscription as the color, pattern or text of the normal marker state. Thus, if the normal marker state is black and the masks are black, then the gauge would appear to a user as a standard black cap.

Figure 3:
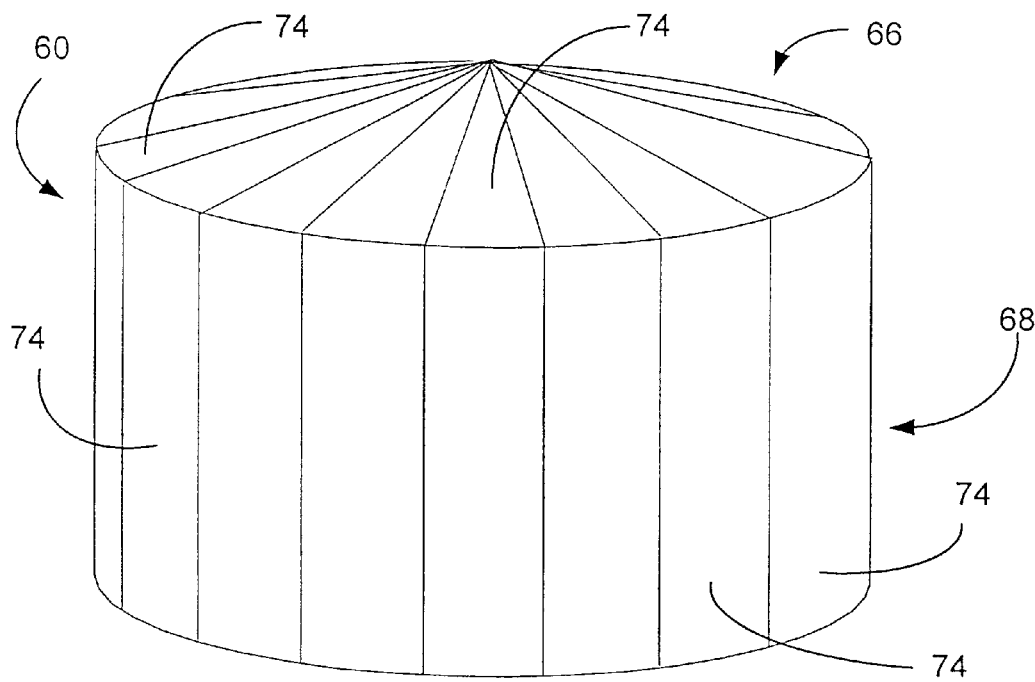
FIG. 3 is a perspective view of the movable indicator member of FIG. 1.

Referring to FIGS. 1 and 3, the gauge 10 also includes a moveable indicator member 60 of a generally cylindrical shape having an opening 62 at its bottom 64, a closed top 66 having a pivot point 67 associated therewith designed to rotatably engage indentation 53 of cap 50, and an outer surface 68. The top 66 is shown as conical shaped, but any other shape will work as well. Integral with or attachable to the indicator member 60 and located on the inner surface or cylinder wall 68 are two diametrically opposed cam followers or pins 72 designed to fit within the channels 44 in the cam 40 so that axial motion of the cam 40 is converted into rotational motion of the indicator member 60. It should be recognized that the cam could have the pins and the indicator could have the helical grooves.

The indicator member 60 has a plurality of marker regions 74 associated with the cylindrical surface 68 and the top 66 or a portion thereof. The placement and spacing of the regions 74 are designed to operate in conjunction with the windows 52 and masks 54 of the cap 50 so that a change in pressure in the pneumatic device cause a change in indicator state due to the rotation of the indicator 60 relative to the cap 50.

The gauge 10 also includes a bias member 76, shown in FIG. 1 as a simple mechanical spring, interposed between the indicator member 60 and the cam member 40. The gauge 10 also includes a chamber 78 formed between the top 24 of actuator 20 and the lower surface 36 of the flexible membrane 30. The gauge 10 can further include a suitable seal 80 interposed between the transparent cap 50 and the base 12. The seal 80 is non-hermetic and is designed to restrict environmental contaminants from entering the gauge, however it will permit the cap side of the gauge to remain in equilibrium with ambient pressures.

The gauge 10 can also include a cap lock which locks the cap in place once it has been rotated so that the gauge 10 displays its normal state such as displaying the color green or a given pattern or combination thereof. Lock is preferably a frictional lock engaging cap 50 to base 12. Non-limiting examples of suitable locks include compression rings, clip rings, threaded compression rings, fold over tabs or the like. These locks may be integral with or in addition to the seal 80.

A pressure in the chamber 78 which is substantially similar if not exactly the same as the pressure inside the pneumatic device such as a tire, exerts a force per unit area on the membrane 30 at its bottom surface 36 When the pressure in the pneumatic device is normal or set to a desired setting, then the cap 50 is adjusted (rotated) to place the gauge in a normal or first indicator state. Adjusting (rotating) the cap 50 has the effect of changing a position of the cap 50 and its associated windows 52 and masks 54 relative to the markers 74 associated with the indicator member 60. The adjustment is discontinued when the gauge visibly displays a normal or first indicator state, i.e., when the windows 52 align with a set of markers 74 that correspond to the normal state such as markers that are green.

The gauge 10 will not change to a new or different indicator state unless or until the tire side force is no longer substantially equal and opposite to the cap side force that is maintained on the chamber 78 by the bias member 76. An imbalance between the cap side and tire side forces due to a change in the pressure in the pneumatic device will cause a volume of the chamber 78 to change thereby causing the membrane 30 to move up or down depending on whether the tire side force is greater than or less than the cap side force.

The resulting displacement of the membrane 30 is directly communicated to the cam shaft 46 which is constrained to move axially, either up or down within the bore 38. The resultant axial displacement of the cam 40 is converted to an angular displacement (a rotational or angular movement) of the indicator member 60 due to the interaction of the cam followers 72 constrained within the helical grooves 44 associated with the cam 40. The resultant angular displacement or rotational movement of the indicator member 60 relative to the previously fixed position of the cap 50 and its associated windows 52 producing a visual change of the indication state evidencing the change in pressure in the pneumatic device and warning the user of the change in pressure.

Figure 4:
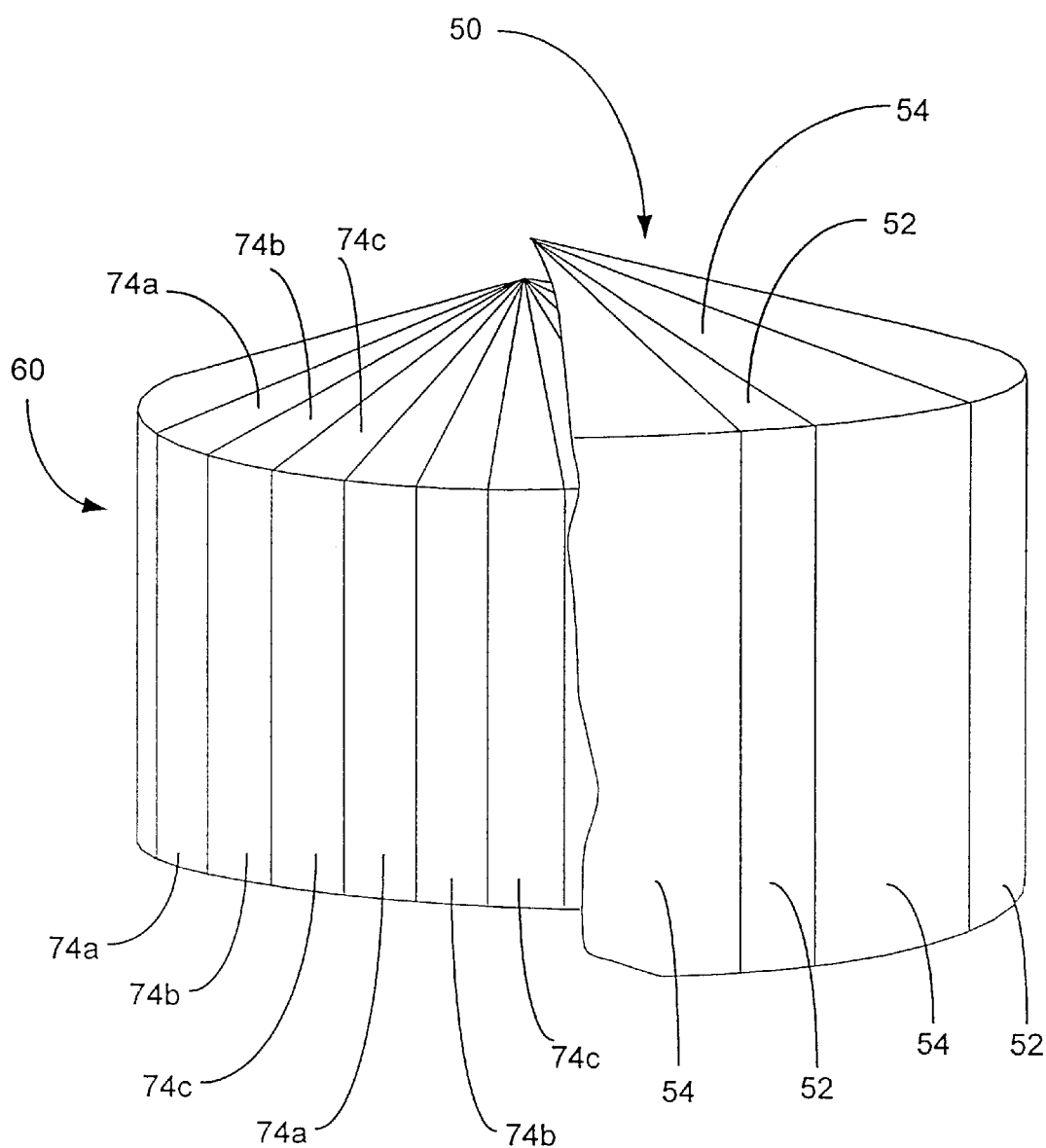
FIG. 4 is a perspective view of the cap and indicator of FIG. 1.

Referring to FIG. 4, a detailed view of the cap 50 and its associated windows 52 and masks 54 and indicator member 60 having three different markers 74a–c are shown. The indicator member 60 which rotates or turns in response to a change in volume of the chamber 78 and the cap 50 and its associated windows 52 and opaque regions 54 after the cap 50 was rotated or turned when the gauge 10 was set of its normal indicator state. When the volume of the chamber 78 changes the indicator 60 rotates or turns with respect to the cap 50 causing a different amount of each of the markers 74a–c to be viewable through the windows 53 associated with cap 50.

As shown in FIG. 4, the indicator 60 has vertically oriented marker stripes or bands 74 having three different marker types 74a–c which are grouped so that the marker type 74a is followed by type 74b which in turn is followed by type 74c and each marker type 74a–c has a width d, which width can be the same or different and is preferably the same. These marker types 74a–c can include colors, symbols, patterns or combination thereof that are distinguishable or discernible one from the other by the human eye. The number of unique marker types corresponds to the number of indicator states (warning levels) to be visually displayed, while the number of times a grouping is repeated (1 or more groups of repeating grouping) will be proportional to a desired visual intensity of each indicator state. If the type 74a is green, the type 74b is yellow and the type 74c is red, then green would correspond to the normal state, yellow to a under inflated tire and red to a seriously under inflated tire.

The cap 50 is configured with vertically disposed windows or openings 52 and opaque regions 54 where the windows 52 have a width d' substantially equal to the width d of the markers 74, while the masks or opaque regions 54 have a width substantially equal of twice the width of the markers 74. Thus, the windows 52 and the masks 54 of the indicator member 50 cooperate so that the same indicator state is displayed in each window 52. The actual width of the markers is a function of both the predefined spring rate and the geometry of the helical grooves 44 associated with the cam 40. Hence, the present invention enables the transformation of a very small displacement into an amplified visual indication of a pressure change. This is exactly the characteristic required to successfully deliver a functional visual tire pressure indicator cap to a needful market. In fact, the relative movement of the cam and the indicator can be controlled by a twist angle of the helical groove where the twist angle is the angle the groove makes with a horizontal axis of the cam. If the twist angle is 45 degrees, then the relative motion of the cam and the indicator are linear, while if the angle is less than 45 degrees the indicator moves a greater amount relative to a given vertical displacement of the cam. And conversely, when the angle is greater than 45 degrees, the indicator moves a lesser amount relative to a given vertical displacement of the cam.

Referring back to FIG. 1, note that the end of cap 50 is free to rotate relative to the base 12 This permits the cap 50 to be turned either clockwise or counterclockwise thus changing the relative position or alignment of the windows 52 relative to the markers 74 of indicator member 60. Thus, a method is provided to manually align or set the gauge to a normal or first indicator state or color indicator state (e.g., green) corresponding to a desired or reference pressure. Once aligned, any changes in the actual tire pressure will cause the indicator member 60 to be displaced relative to the cap 50 and result in highly visual warning through a change in the indicator state.

Figure 5:
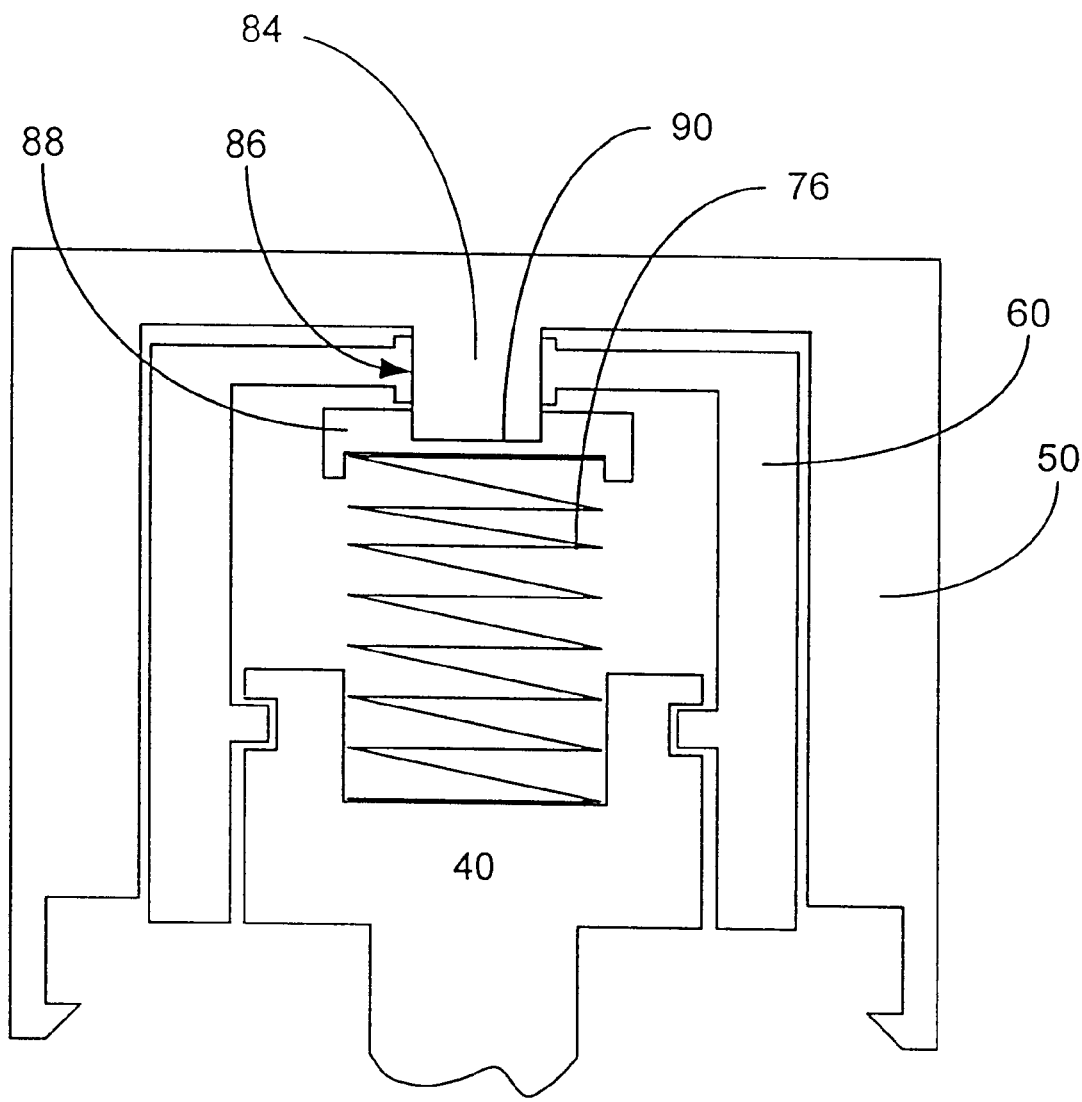
FIG. 5 is a second preferred embodiment of a upper portion of a gauge of the present invention.

Referring now to FIG. 5, an alternate embodiment of the construction of the cap 50, the indicator 60, the cam 40 and the bias member 76 is shown. In this construction, the cap 50 has a downward pointing protrusion or shaft 84 and the indicator 60 has an top aperture 86 designed to rotatably receive and engage the cap shaft 84. The cap 50 also includes a bias member anchor 88 associated with an end 90 of the shaft 84. This construction in an alternative to using a pivot point as shown in FIGS. 1, 3 and 4. Of course, other constructions can be used as well provided that the cap and indicator are both rotatable.

The gauge of the present invention may be set to change indicator states at various pressure increments. The pressure increment in which the indicator states change may, for example, be adjusted by varying the angle of grooves or channels 44 of cam 40 for a given width of windows 52 and masks 54. Alternately, the width of windows 52 and masks 54 may be varied for given angle of groove 44. In addition, bias member 76, cam 40, indicator member 60 and cap 50 may also be changed or interchanged to adapt the present invention to change indicator states at various pressure increments. The above factors are adjusted to that preferably, every loss in pressure of about 5 psi translates into a angular displacement equal to the width of one colored band thereby changing the visual indicator state.

In operation, the tire is first pressured to a desired pressure as measured by an external measuring device. The gauge 10 is then screwed onto the tire valve stem and snugged into place. Slowly rotate the cap 50 counterclockwise (or clockwise) until a first indicator state is visually achieved.

This procedure is repeated for each tire and each device will indicate a visible first indicator state corresponding to the proper pressure for the tire. As a tire begins to loose pressure, the indicator member 60 will rotate relative to the windows 52 due to the imbalance of forces across the flexible membrane 30 and a different indicator state becomes strongly visible.

Figure 6:
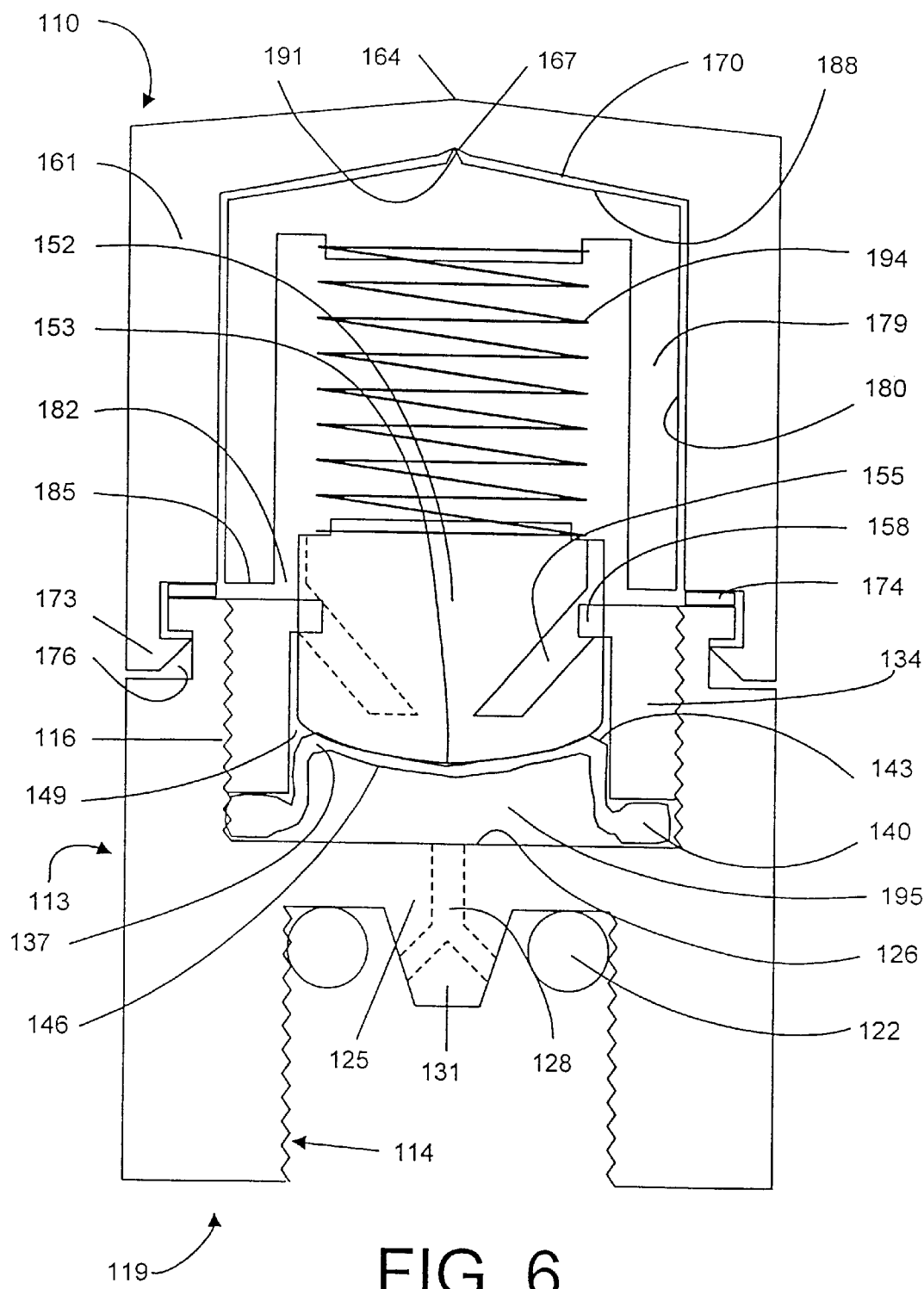
FIG. 6 is a cross-sectional view of a preferred embodiment of a gauge of the present invention.

Referring now to FIG. 6, the present invention can be seen to be a gauge, generally as 110, including a tubular or cylindrical base 113 having internal threads 114 on a lower portion 119 thereof where the base 113 and threads 114 are designed to detachably engage threads of a tire valve stem (not shown). The top of base 113 includes internal threads 116 and may also include a suitable seal 122 designed to form a hermetic seal with the valve stem.

The valve stem actuator 125 divides the base 113 into upper and lower portions and is shown integral with the base 113. The actuator 125 includes apertures 128 therethrough, upper surface 126 and a downward projection 131, designed to depress a valve in the tire stem permitting fluid pressure communication between the interior of the tire and the upper portion of the base 113 through the apertures 128.

The gauge 110 also includes a flexible membrane 137 secured and sealed in place by a bore sleeve 134. The bore sleeve 134 is shown to be threaded and detachably engaged to the upper portion of base 113, though snap-fit or any other suitable restraining technique is anticipated. The flexible membrane 137 is preferably composed of a resilient, fatigue resistant, air impermeable elastic or inelastic material including, without limitation, a cured rubber formulation containing polyisobutylene or other similar air impermeable composition that are resilient and fatigue resistant. The flexible member 137 has a generally circular shape with a uniformly thin pliable center section and a ring-like thicker outer circumference 140 for forming a seal between the top 126 of the actuator 125 and the bore sleeve 134. The flexible membrane 137 includes an upper surface 143 and a lower surface 146. There are numerous alternate and obvious designs to hermetically retain the flexible member. For example a snap-fit sleeve could retain the flexible member approaching it from the bottom of the base (positions the sleeve below the flexible member), rather than a threaded sleeve impinging downward on the flexible member as shown in FIG. 6.

Figure 7:
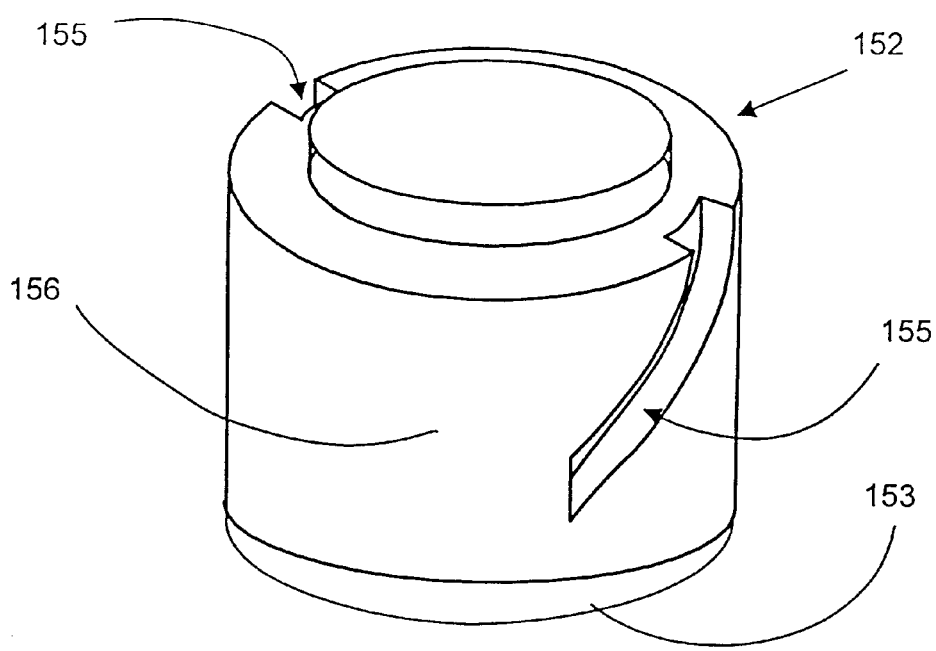
FIG. 7 is a perspective view of the cam of FIG. 6.
Figure 9:
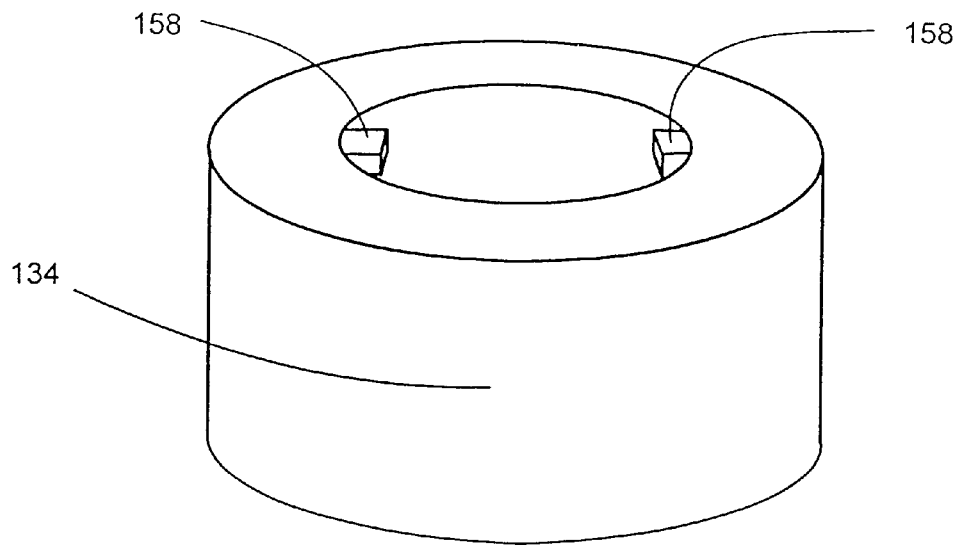
FIG. 9 is a perspective view of the bore sleeve with tab guides of FIG. 6.

Referring to FIGS. 6, 7, and 9, the bore sleeve 134 defines a cylinder 149 into which the flexible member 137 extends and which is designed to receive a cam member 152. The cam 152 includes a cylindrical body 156 having two opposed helical grooves or channels 155 therein and a contoured bottom surface 153 designed to engage the upper surface 143 of the flexible membrane 137. The cam 152 is designed to slidingly engage the cylinder 149 such that the bore tabs 158 are aligned with and engage each of the cam grooves 155. The cooperation of the bore tabs 158 and the helical cam grooves 155 urge the cam to exhibit both an axial and angular (helical) displacement.

Referring back to FIGS. 6 and 10, the gauge 110 further includes an adjustable cylindrically shaped cap 161 having a plurality of windows 211 separated by a plurality of opaque masks 208 for viewing a indicator state of the gauge 110 during use and a conically shaped top 164. The cap 161 attaches to the base 113 by a mechanical coupling that allows the cap 161 to rotate. In FIG. 6, the cap 161 includes a lip 173 and the base 113 includes a lip receiving groove 176 so that the cap 161 snaps onto the base 113, yet the attachment permits the cap 161 to rotate relative to the base 113. The cap 161 also includes a pivot indentation 167 at an apex of inner surfaces 170 of the cap 161. The cap 161 is preferably transparent with windows 211 and opaque masks 208 associated either with an interior or exterior surface of the cap 161 and extending onto a top of the cap 161 or a portion thereof. The associated masks may be deposited or etched preferably on the inner surfaces 170 of cap 161 (as with a paint-like process) or may be fashioned from a thin foil or other suitable surface liner material that is secured to the inner surfaces 170 of the cap 161. The masks can be colored, patterned, textual inscribed or a combination thereof. In fact, the masks can be colored, patterned or textually inscribed with the same color, pattern or textual inscription as the color, pattern or text of the normal marker state. Thus, if the normal marker state is black and the masks are black, then the gauge would appear to a user as a standard black cap.

Figure 8:
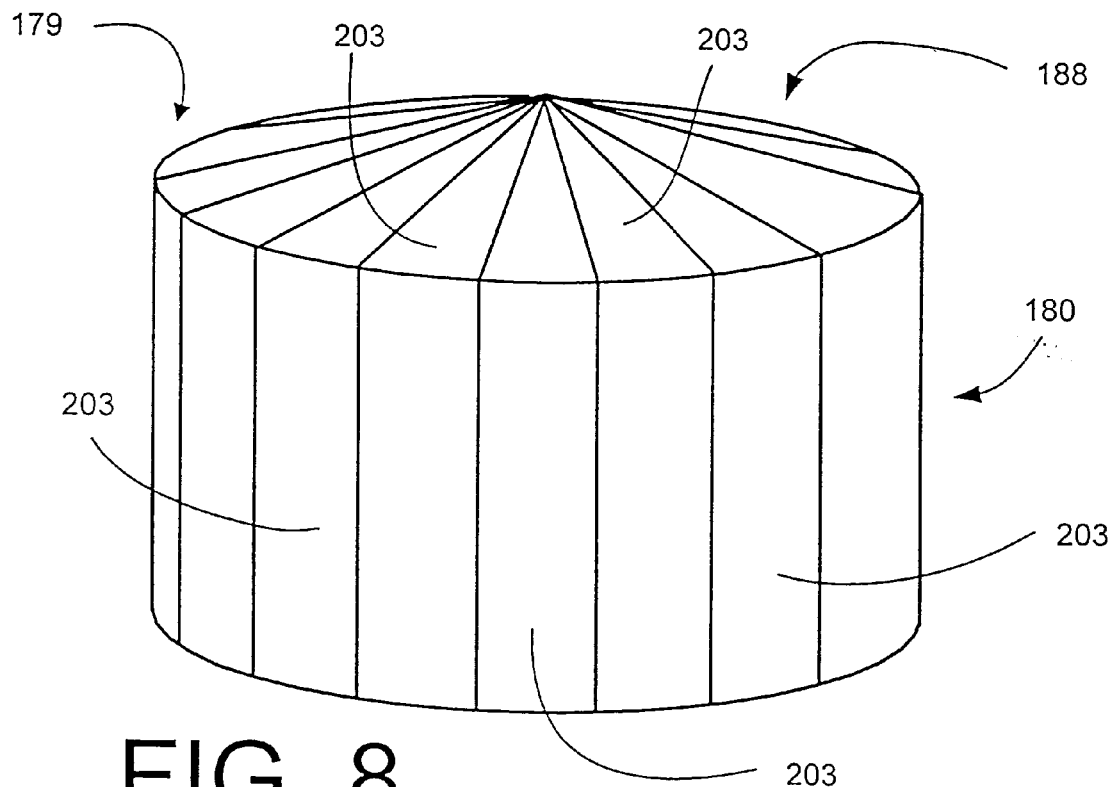
FIG. 8 is a perspective view of the rotary indicator member of FIG. 6.
Figure 10:
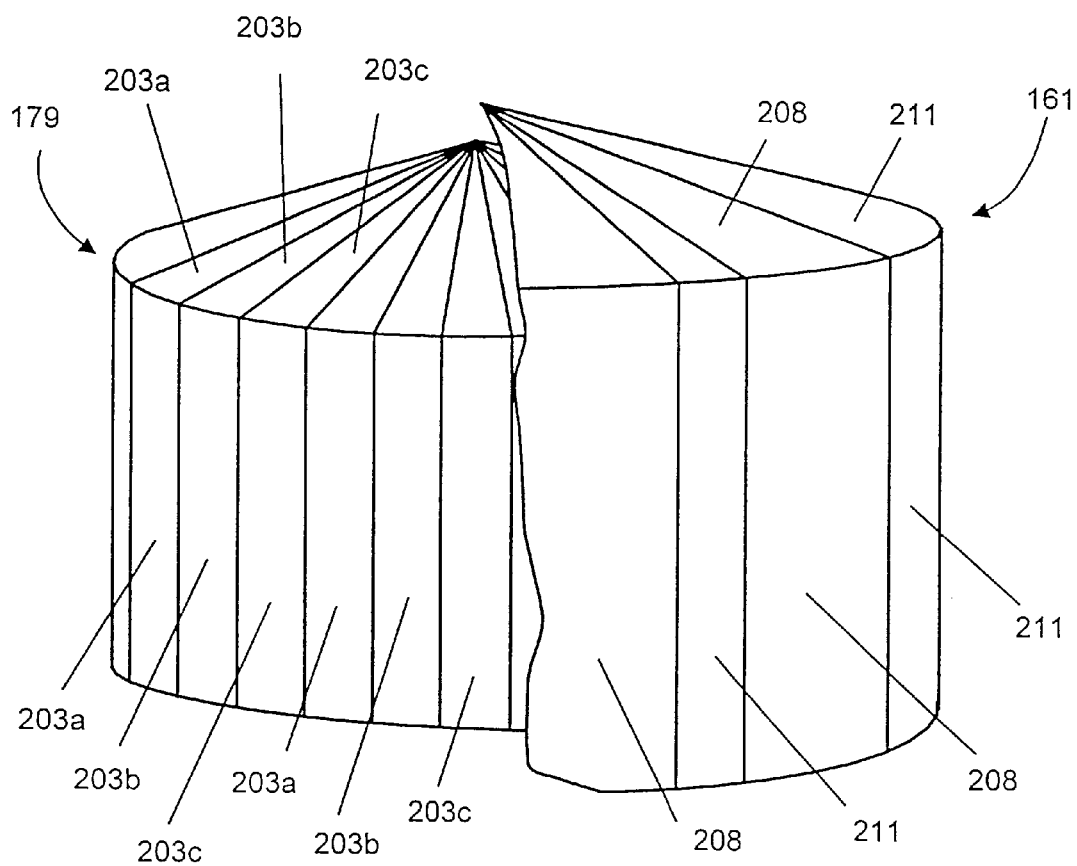
FIG. 10 is a perspective view of the cap and rotary indicator of FIG. 6.

Referring to FIGS. 6, 8 and 10, the gauge 110 also includes a rotary indicator member 179 of a generally cylindrical shape having an opening 182 at its bottom 185, a closed top 188 having a pivot point 191 associated therewith designed to rotatably engage indentation 167 of cap 161. The top 188 is shown as conical shaped, but any other shape will work as well.

The indicator member 179 has a plurality of marker regions 203 associated with the cylindrical surface 180 and the top 188 or a portion thereof. The placement and spacing of the marker regions 203 are designed to operate in conjunction with the windows 211 and masks 208 of the cap 161 so that a change in pressure in the pressurized device cause a change in indicator state due to the rotation of the indicator 179 relative to the cap 161. The markers may be deposited or etched on the surfaces of indicator member 179 (as with a paint-like process) or may be deposited or etched on a suitable substrate material (as with a printing-like process) that is secured to the surfaces of the indicator member 179.

The gauge 110 also includes a bias member 194, shown in FIG. 6 as a simple mechanical spring, interposed between and fixed on either end to the indicator member 179 and the cam member 152. The gauge 110 also includes a chamber 195 formed between the top 126 of actuator 125 and the lower surface 146 of the flexible membrane 137. The gauge 110 can further include a suitable seal 174 interposed between the transparent cap 161 and the base 113. The seal 174 is non-hermetic and is designed to restrict environmental contaminants from entering the gauge, however it will permit the cap side of the gauge to remain in equilibrium with ambient pressures.

The gauge 110 can also include a cap lock which locks the cap in place once it has been rotated so that the gauge 110 displays its normal state such as displaying the color black or green or a given pattern or combination thereof. Lock is preferably a frictional lock engaging cap 161 to base 113. Non-limiting examples of suitable locks include compression rings, clip rings, threaded compression rings, fold over tabs or the like. These locks may be integral with or in addition to the seal 174. Additionally, the cap 110 can be constrained with stops or the like to restrict cap rotation to a predetermined angular displacement. This restricted displacement may be less than the width of a single band sequence and would, thus, prevent calibration of the gauge if the pressurized device had a pressure below a predetermined minimum pressure.

Referring now to FIGS. 6 and 10, a pressure in the chamber 195 which is substantially similar if not exactly the same as the pressure inside the pressurized device such as a tire, exerts a force per unit area on the membrane 137 at its bottom surface 146. Providing the current pressure in the pressurized device is normal or has been set to a desired pressure, then the cap 161 is adjusted (rotated) to place the gauge in a normal or first indicator state. Adjusting (rotating) the cap 161 has the effect of changing a position of the cap 161 and its associated windows 211 and masks 208 relative to the markers 203 associated with the indicator member 179. The adjustment is discontinued when the gauge visibly displays a normal or first indicator state, i.e., when the windows 211 align with a set of markers 203 that correspond to the normal state such as markers that are black.

The gauge 110 will not change to a new or different indicator state unless or until the tire side force is no longer substantially equal to the cap side force that is maintained on the chamber 195 by the bias member 194. An imbalance between the cap side and tire side forces due to a change in the pressure in the pressurized device will cause the membrane 137 to move axially up or down depending on whether the tire side force is greater than or less than the cap side force.

The resulting displacement of the membrane 137 is directly communicated to the cam 152 which is constrained to move helically within the cylinder 149. The resultant angular displacement of cam 152 is communicated to the rotary indicator 179 through the bias member 194. This angular displacement of the indicator member 179 relative to the previously fixed position of the cap 161 and its associated windows 211 produces a visual change in the indication state evidencing the change in pressure in the pressurized device and warning the operator of the change in pressure.

Referring to FIG. 10, the indicator 179 has vertically oriented marker stripes or bands having three different marker types 203a–c which are grouped so that the marker type 203a is followed by type 203b which in turn is followed by type 203c and each marker type 203a–c has a same width d. These marker types 203a–c can include colors, symbols, patterns or combination thereof that are distinguishable or discernible one from the other by the human eye. The number of unique marker types corresponds to the number of indicator states (warning levels) to be visually displayed, while the number of times a grouping is repeated (1 or more groups of repeating grouping) will be proportional to a desired visual intensity of each indicator state. If the type 203a is black, the type 203b is yellow and the type 203c is red, then black would correspond to the normal state, yellow to a under inflated tire and red to a seriously under inflated tire.

The cap 161 is configured with vertically disposed windows or openings 211 and masks 208 (opaque regions) where the windows 211 have a width d' substantially equal to the width d of a single marker, while the masks or opaque regions 208 have a width substantially equal to twice the width of a single marker. Thus, the windows 211 and the masks 208 of the cap 161 cooperate with the markers 204a–c so that the same indicator state (or fraction of adjacent indicator states) is displayed in each window 211. Note that if the marker types 203a, 203b and 203c were the colors black, yellow and red respectively and the opaque regions 208 were also the color black, then calibrating (manually rotating the cap 161) the gauge to a normal or first indicator state will result in the entire cap appearing black in color. If the tire pressure were to fall below normal, a yellow indication would result, and a further drop in pressure would be signaled by a red indication.

Figure 11:
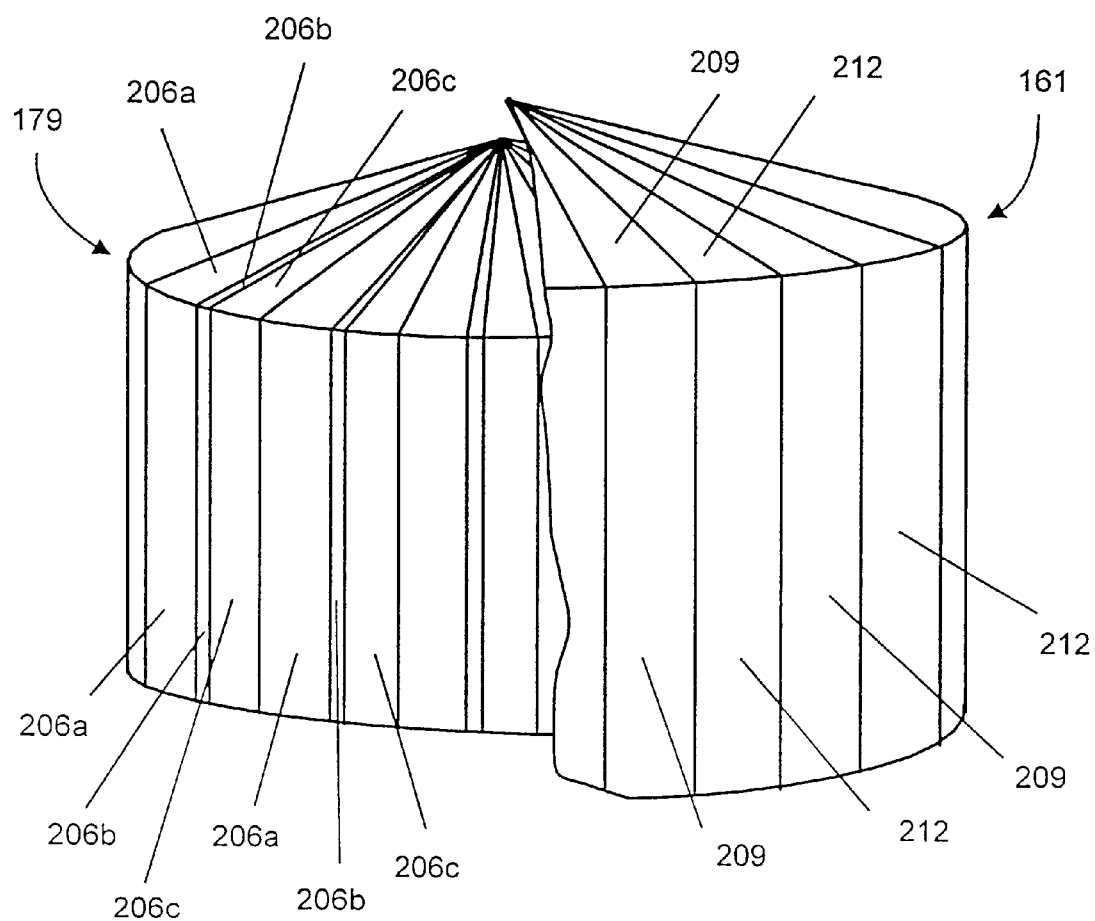
FIG. 11 is a perspective view of an alternate embodiment of the cap and rotary indicator of FIG. 10.

An alternate and preferred embodiment of the indicator and mask/window configuration can be seen in FIG. 11. This embodiment maximizes the amount of visible indicator area (window area) relative to the mask area (opaque area). The previous embodiment defined a opaque mask area twice as large as the window or indicator area and that configuration limits the indicator area to only one third (⅓) the total viewing area while the mask region represents two thirds (⅔) of the total viewing area. The preferred embodiment as shown in FIG. 11 results in both the indicator (window area) and masking (opaque) regions to have equal widths (each representing 50 percent of the total viewing area). The marker bands are denoted as 206a, 206b and 206c. Note that the width of the different marker types are not equal (as they were in the first embodiment, FIG. 10). The width of the first marker 206a is equal the width of the window 209 and the sum of the widths of markers 206b and 206c together has a width equal to the width of the window 209. If the marker types 206a, 206b and 206c were the colors black, yellow and red respectively and the masks 212 (opaque regions) were also the color black, then calibrating (manually rotating the cap 161) the gauge to a normal or first indicator state will result in the entire cap appearing black in color. If the tire pressure were to fall below normal, a yellow indication would first result, and a further drop in pressure would be signaled by a yellow and red indication.

The actual width of the markers is a function of both the predefined spring rate and the geometry of the helical cam grooves. Hence, the present invention enables the transformation of a very small displacement into an amplified visual indication of a pressure change. This is exactly the characteristic required to successfully deliver a functional visual tire pressure indicator cap to a needful market. In fact, the relative movement of the cam and the indicator can be controlled by varying the geometry of the helical groove in the cam. If the helix angle (the angle of the groove as measured from the horizontal axis of the cam) is 45 degrees, then the relative axial and angular displacements are nearly the same. If the helix angle is less than 45 degrees the angular displacement is attenuated and the indicator moves a greater amount relative to a given axial displacement of the cam. And conversely, when the helix angle is greater than 45 degrees, the indicator moves a lesser amount relative to a given axial displacement of the cam. Of course, the helix angle is bound to be greater than 0 degrees and less than or equal to 90 degrees (i.e., at a helix angle of 90 degrees, any axial displacement would result in no angular displacement, whereas at 0 degrees, the groove is perpendicular to the axial direction so no axial (or angular) displacement is possible. A cam groove could be designed as a combination of different helix angles, i.e., where initially it is 90 degrees (allowing a predetermined amount of spring compression to occur with no indicator movement), and then aligns to a 40 degree angle where the indicator displacement is actually attenuated relative to the axial displacement.

Referring back to FIGS. 6, 8 and 10, note that the end cap 161 is free to rotate relative to the base 113. This permits the cap 161 to be turned either clockwise or counterclockwise thus changing the relative position or alignment of the windows 211 relative to the markers 203 of indicator member 179. Thus, a method is provided to manually align or set the gauge to a normal or first indicator state or color indicator state (e.g., black) corresponding to a desired or reference pressure. Once aligned, any changes in the actual tire pressure will cause the indicator member 179 to be displaced relative to the cap 161 and result in strongly visual warning through a change in the indicator state.

Figure 12:
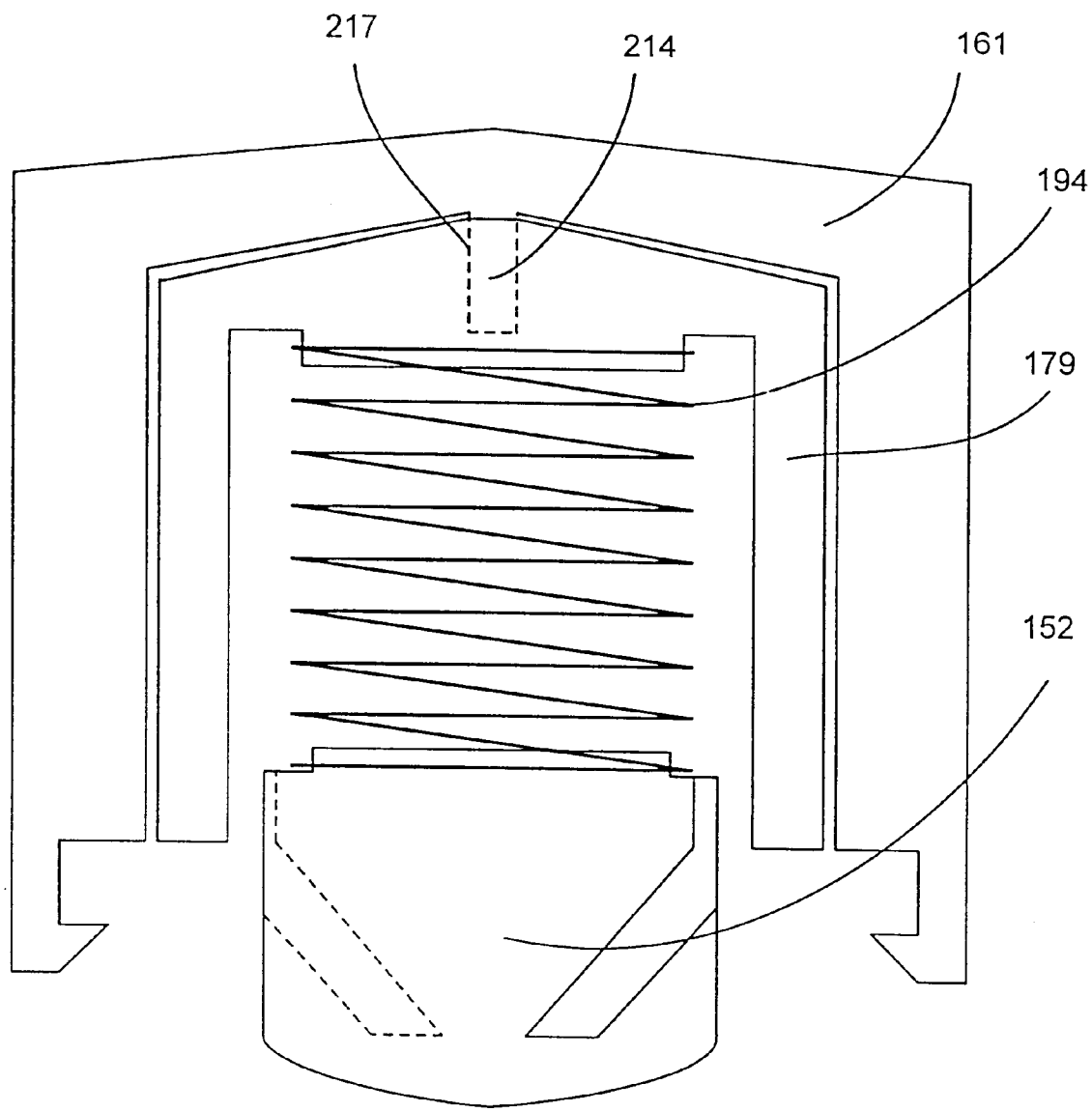
FIG. 12 is an alternate embodiment of a upper portion of the gauge of FIG. 6.

Referring now to FIG. 12, an alternate embodiment of the construction of the cap 161, the indicator 179, the cam 152 and the bias member 194 is shown. In this construction, the cap 161 has a downward pointing protrusion or cap shaft 214 and the indicator 179 has an top aperture 217 designed to rotatably receive and engage the cap shaft 214. This construction in an alternative to using a pivot point as shown in FIG. 6. Of course, other constructions can be used as well provided that the cap and indicator are both rotatable.

Figure 13:
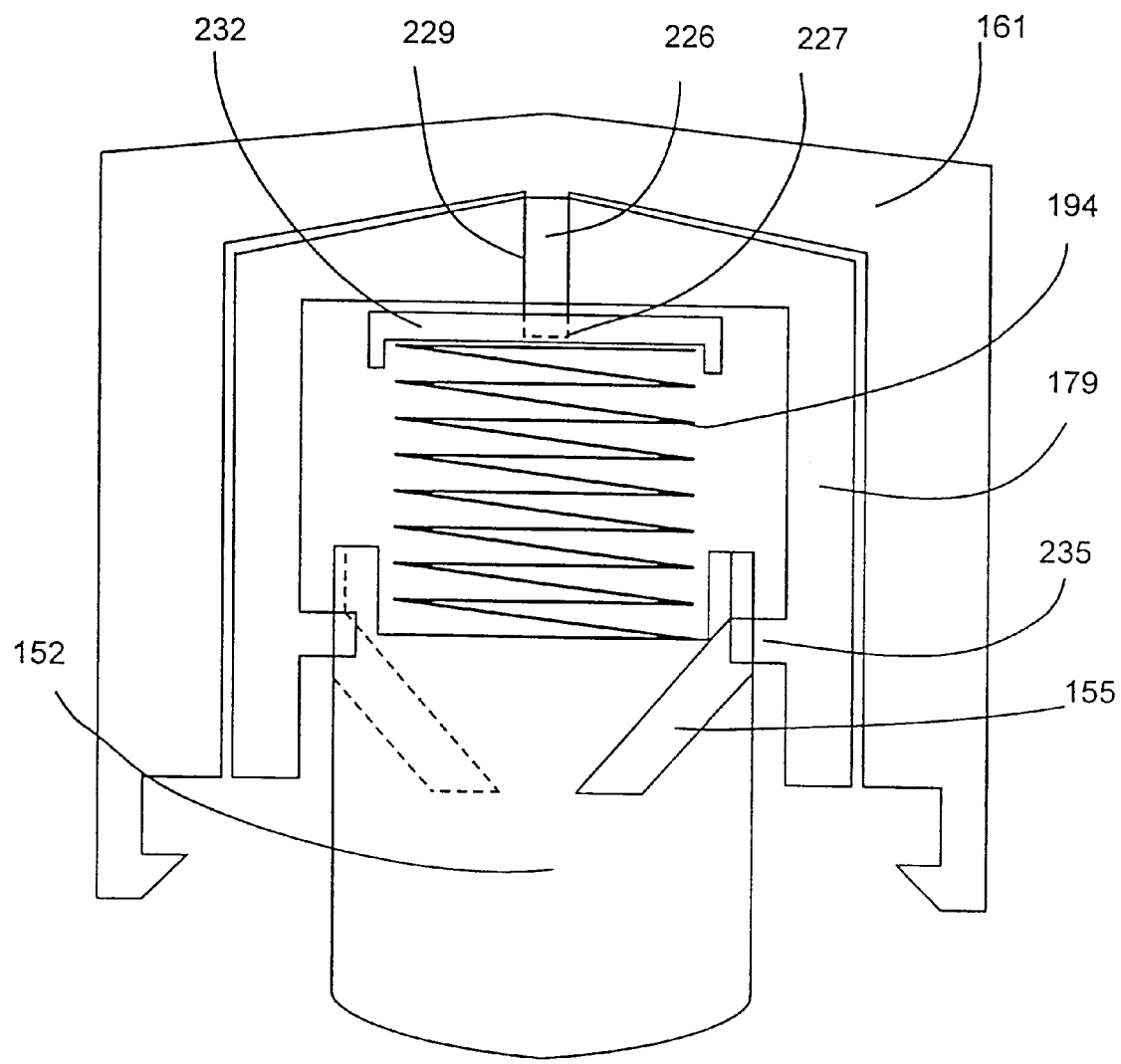
FIG. 13 is an alternate embodiment of the gauge of FIG. 6.

Referring now to FIG. 13, this alternate embodiment of the construction of the cap 161, the indicator 179, the cam 152 and the bias member 94 is shown. In this construction, the cap 161 has a downward pointing protrusion or shaft 226 and the indicator 179 has an top aperture 229 designed to rotatably receive and engage the cap shaft 226. The cap 161 also includes a bias member anchor 232 to rigidly engage an end 227 of the shaft 226. The cam 152, while basically the same as in FIG. 7, has been elongated such that the helical channels 155 may slideably engage the indicator tabs 235 which are affixed to or integral with the indicator 179 thereby converting the cams 152 axial displacement into angular displacement of the indicator 179. Thus in operation as the device pressure changes, the flexible member in cooperation with the bias member or spring will displace the cam 152 axially. The axial displacement of the cam 152 is converted to angular displacement of the indicator 179 whose relative movement with respect to the cap 161 will evidence a visual indicator change. While frictional forces between the flexible member and the cam will likely prevent the cam from exhibiting any angular displacement, the cam may optionally be constrained to axial displacement using a key-way like engagement of the cam and the bore or cylinder in which the cam slides.

Figure 14:
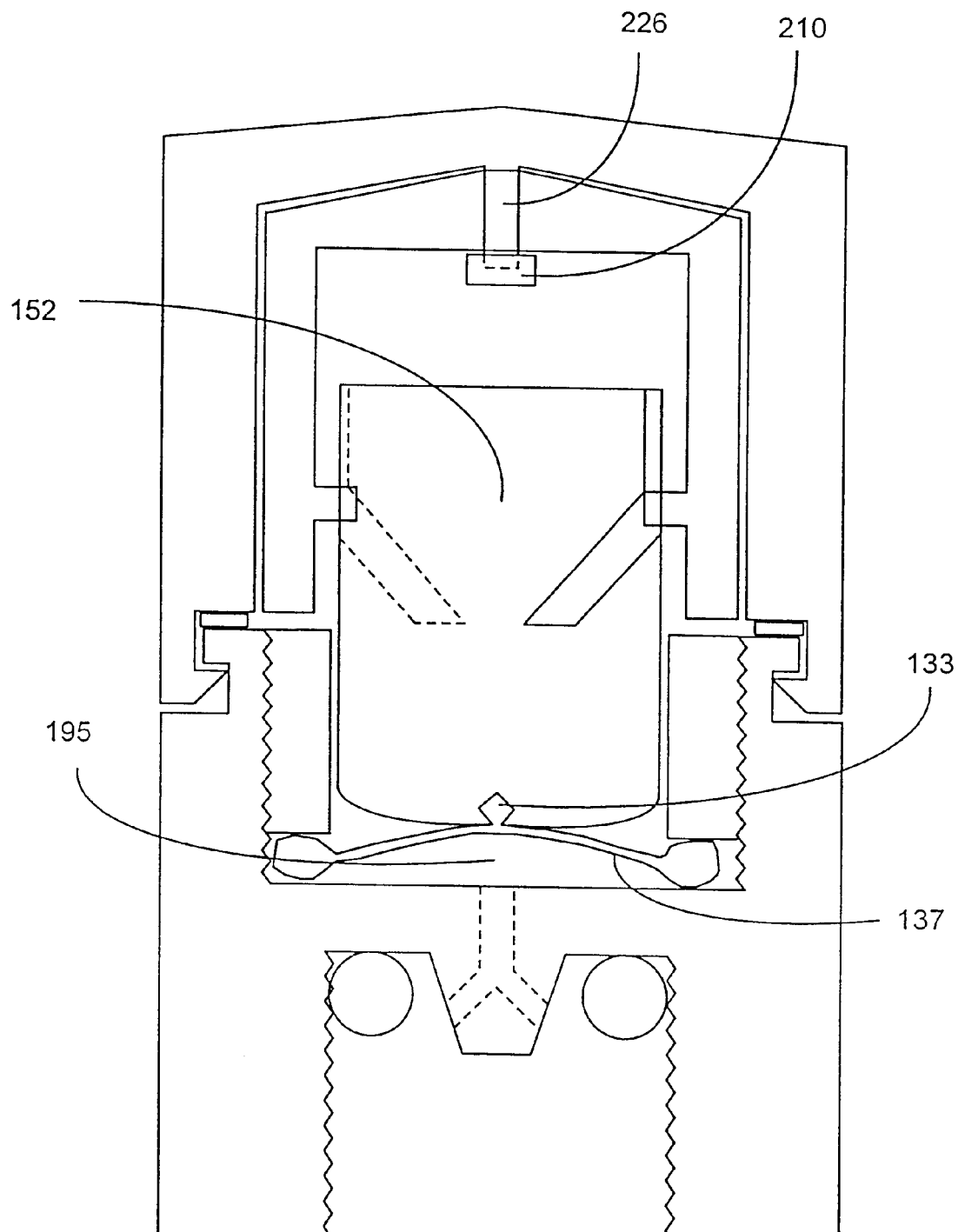
FIG. 14 is an alternate embodiment of the gauge of FIG. 13.

Referring now to FIG. 14, this embodiment of the gauge includes an elastic or rubber-like flexible membrane 137, an indicator retaining member 210 and eliminates the bias member 194 (of FIG. 13). The indicator retaining member 210 is shown rigidly attached to the lower end of cap shaft 226. The membrane 137 is attached to the cam 152 by a vertical protrusion 133 affixed to, or integral with, the center-point of the membrane 137. This configuration constrains the cam to remain in surface contact with the membrane as the membrane is axially displaced in response to changes in chamber 195 pressure. Increasing chamber 195 pressure stretches the membrane 137 and pushes the cam 152 axially upwards, and decreasing pressure allows the elastic membrane 137 to contract and pull the cam 152 axially downward.

The gauge of the present invention may be set to operate across various working pressures ranges as well as various pressure change sensitivities. The working pressure range is determined as a function of the bias member spring-rate as well as the amount of spring pre-compression. The pressure change sensitivity is determined as a function of the bias member spring rate and cam groove helix angle or combination of angles as previously discussed. It is desirable for the gauge of the present invention to work across a wide range of operating pressures in order to satisfy various pressure indicator services. Such services include but are not limited to pneumatic tires for automobiles, motorcycles, bicycles, trucks, tractors and other heavy duty farm or industrial equipment as well as any other pressure measurement services that have similar pressure indicator requirements.

For an automobile tire gauge for example, the gauge should preferably have a working pressure range of between about 15 psi and about 45 psi, particularly between about 20 psi and about 40 psi and especially between about 25 psi and about 35 psi. Preferably, the indicator states would advance with a pressure change of about 5 psi to 10 psi. More preferably, the indicator states would advance with a pressure change of about 3 psi to 5 psi. The pressure increment in which the indicator states change may, for example, be adjusted by varying the spring rate of the bias member and/or the helix angle of grooves or channels of the cam for a given width of windows and masks. Alternately, the width of the windows and masks may be varied for a given angle of cam groove. The above factors are adjusted so that preferably, every loss in pressure of about 3 psi to 5 psi translates into an angular displacement equal to the width of one marker band thereby changing the visual indicator state at each 3 psi to 5 psi increment. Other pneumatic tires in other services have their own set of preferred working pressure ranges and sensitivities that can be accommodated by the gauge of the present invention.

Figure 15:
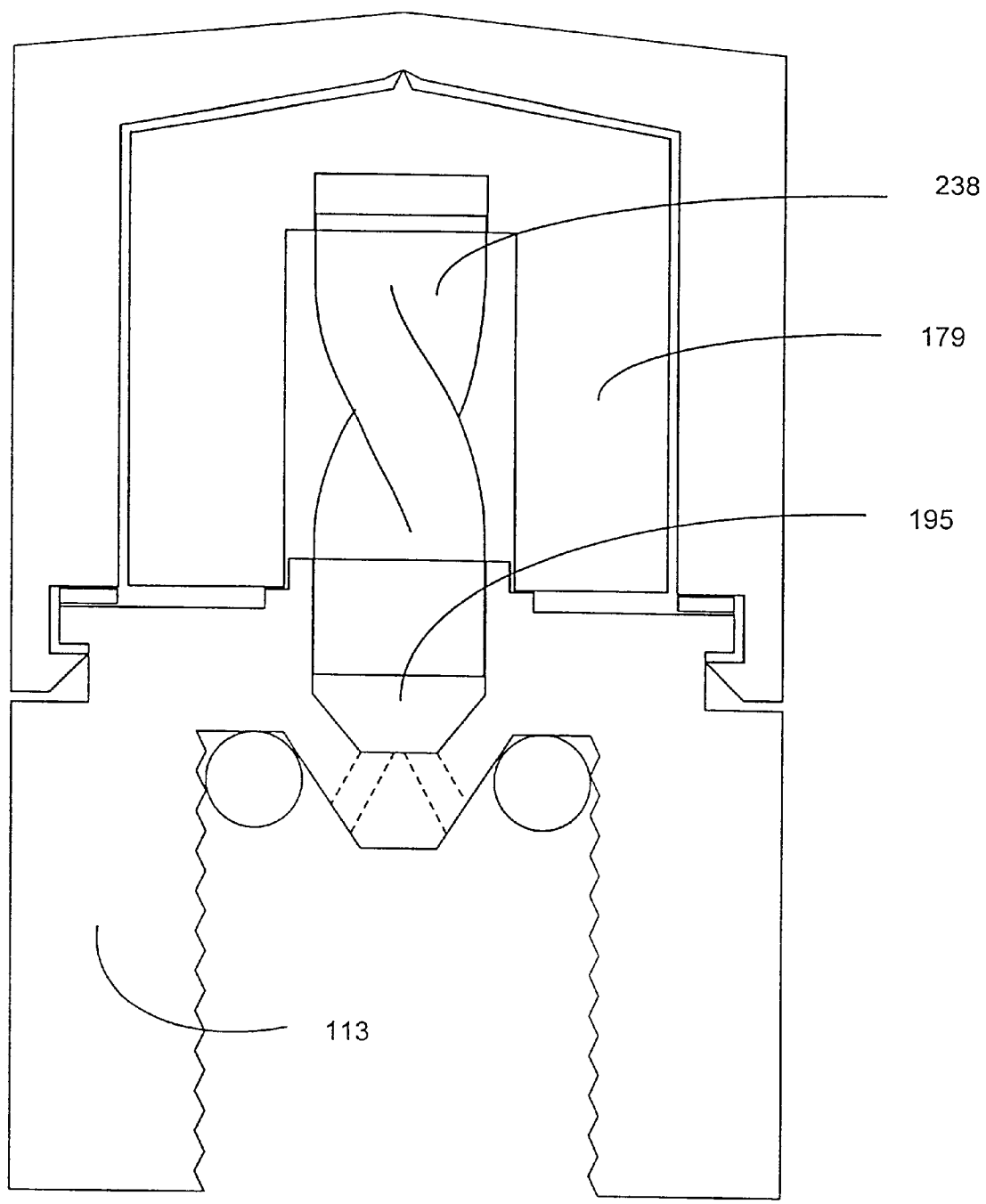
FIG. 15 is an alternate embodiment of the gauge of the present invention.
Figure 16A:
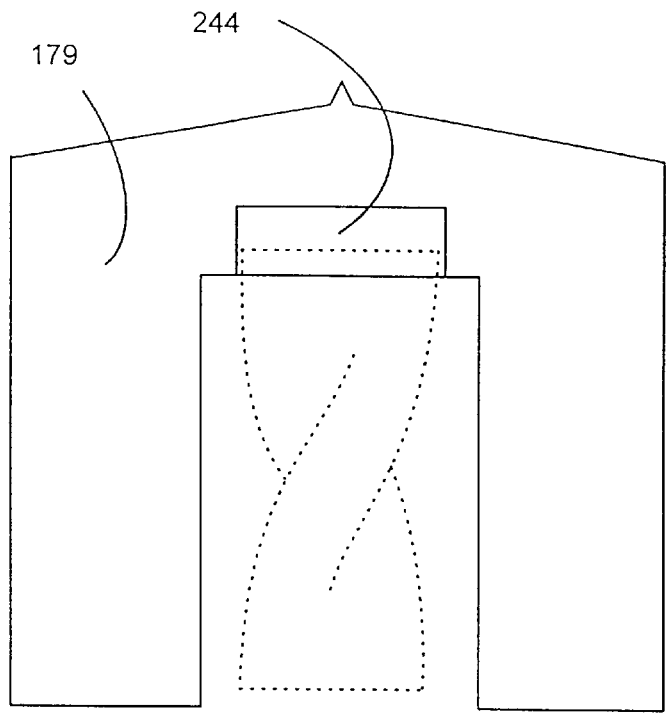
FIG. 16 depicts detail views of the rotary indicator of FIG. 15.
Figure 16B:
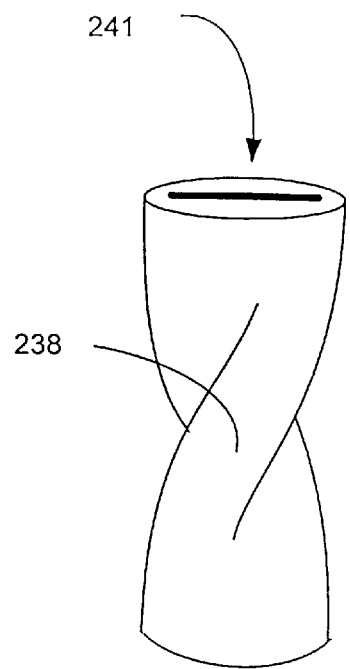
Figure 16C:
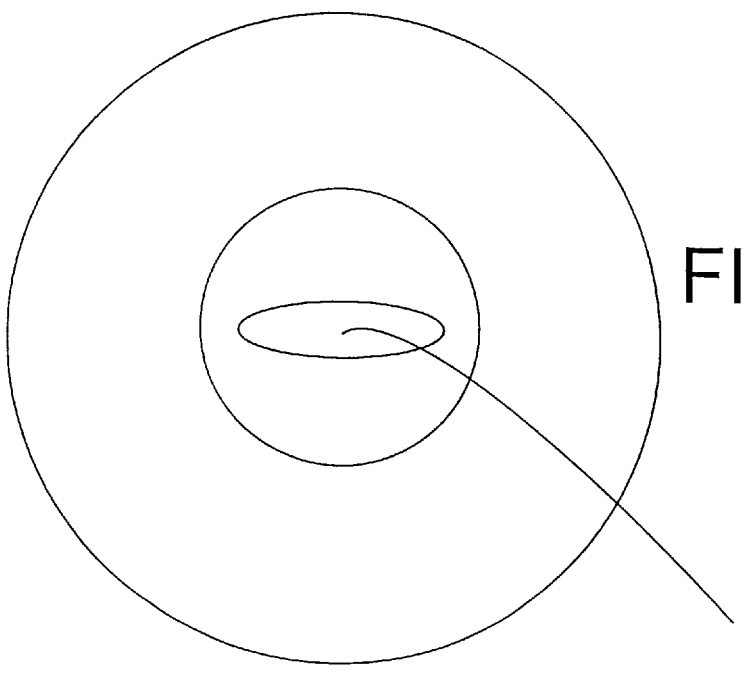

Referring now to FIG. 15, this alternate embodiment of the pressure conversion element of the gauge simplifies the previous designs by eliminating the diaphragm, cam and bias member. The hollow tube-like member 238 is hermetically sealed to the base 113 and its opposite end is hermetically sealed and slidingly engages the rotary indicator 179. The internal surfaces of the tube-like member 238 and the base 113, forms the chamber 195 which is in fluid communication with the pressurized device. The tube-like member 238 may comprise a round or flattened tube exhibiting elastic properties and a form or structure incorporating a twisting or helix-like geometry. As the pressure within the tube-like member 238 changes, the elastic nature of the member along with its helix-like geometry will cause the member to undergo an angular or rotational displacement around its axial length. This mechanical response (coiling and uncoiling) to pressure changes is similar in operation to a bourdon tube or to a hose that has been twisted along its axial length and attempts to untwist under increased internal pressure. FIG. 16 depicts the connection between the tube-like member 238 and the rotary indicator 179 of the gauge referenced in FIG. 15. FIG. 16 shows a sectional view of the rotary indicator 179, a view of the rotary indicator 179 from the bottom and a perspective view of the tube-like member 238. The tube-like member 238 has a tube top end 241 which has been crimped and hermetically sealed. The tube top end 241 slidingly engages the rotary indicator aperture 244 of the rotary indicator 179. Any rotation experienced by the tube-like member 238 is transferred to the rotary indicator member 238 and any axial displacement of the tube-like member 238 is directed into the aperture 244.

Figure 17:
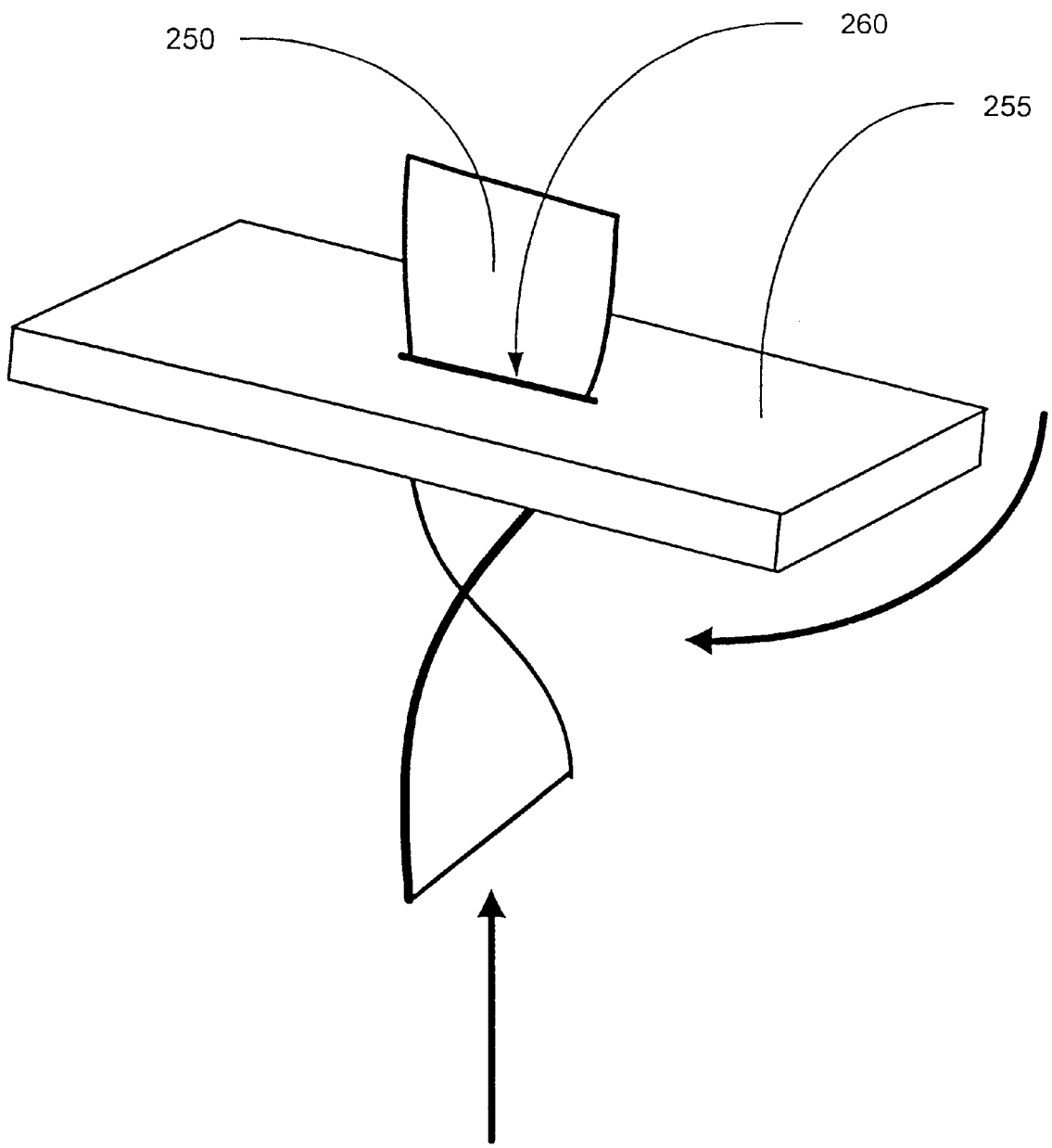
FIG. 17 is an alternate embodiment of a pressure converter mechanism.
Figure 18:
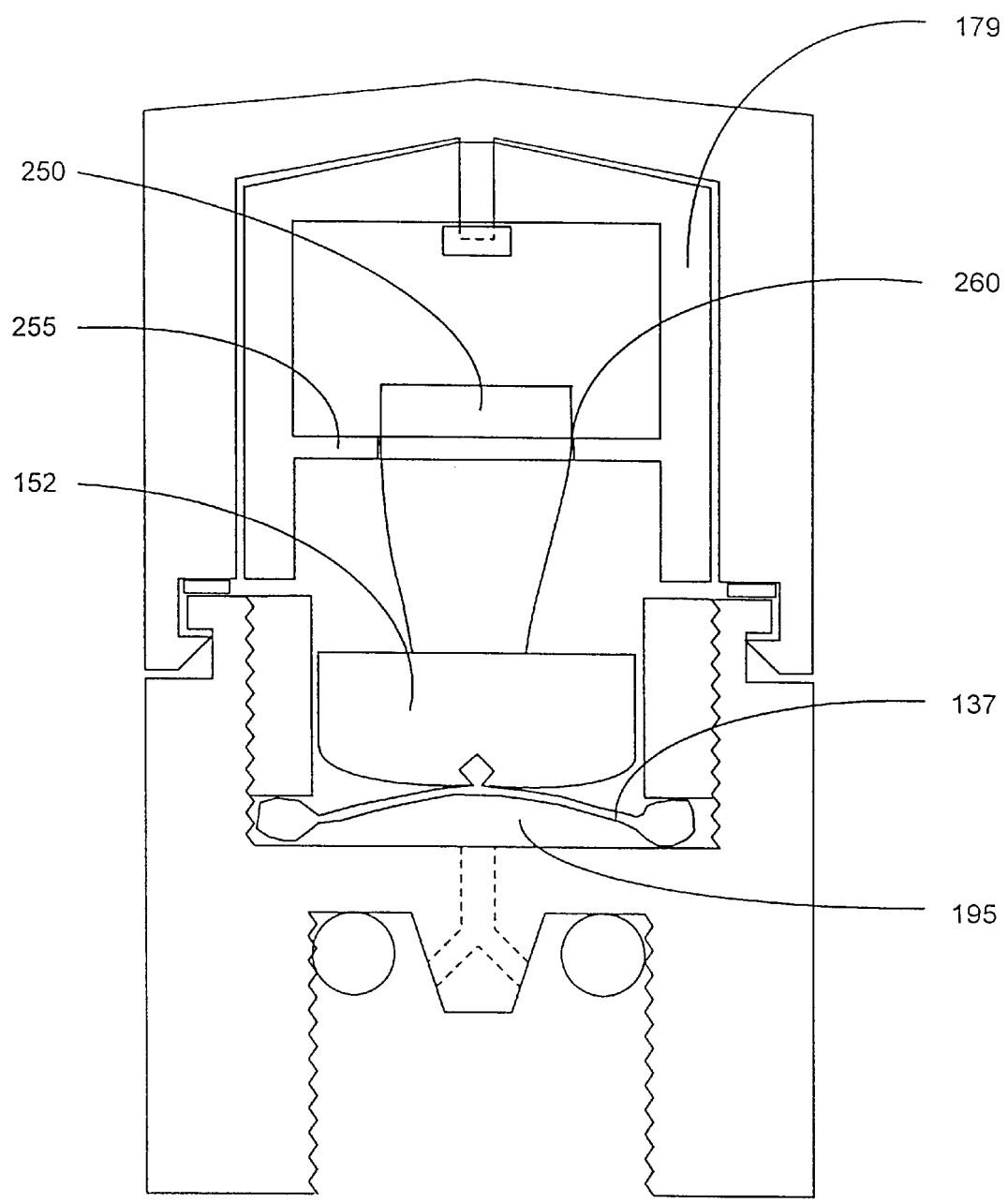
FIG. 18 is an alternate embodiment of the gauge in FIG. 14.

FIG. 17 represents another embodiment of a pressure conversion element of the present invention. A track member 250 comprises a generally flat, rigid, rectangular shape that is axially twisted into a helical geometry. A track follower member 255 includes a follower aperture 260 that slidingly engages the track member 250. Where the track follower member 255 is constrained to only rotational displacement then any axial displacement of the track member 250 will cause the track follower member 255 to undergo an angular displacement proportional to the axial displacement of the track member 250. Referring now to FIG. 18 which represents a variation of the gauge depicted in FIG. 14. The track follower member 255 is affixed to or integral with the rotary indicator 179 and the track member 250 is affixed to or integral with the cam 152. As the pressure in chamber 195 changes, the flexible membrane 137 undergoes an axial displacement that is directly communicated to the cam 152 and attached track member 250. The axial displacement of the helical track member 250 relative to the track follower 255, causes the attached rotary indicator 179 to experience angular (rotary) displacement about its axis.

In operation, the tire is first pressured to a desired pressure as measured by an external measuring device. The gauge is then screwed onto the tire valve stem and snugged into place. Slowly rotate the cap clockwise or counterclockwise, clockwise preferably (to keep gauge snug with tire valve stem) until a full black indicator state is visually achieved. This procedure is repeated for each tire and each device will indicate a visible black indicator state corresponding to the proper pressure for the tire. As a tire begins to loose pressure, the indicator member will rotate relative to the cap windows and the next sequential indicator marker will become strongly visible.

The gauge of the present invention may contain colored or patterned bands each band corresponding to an indicator state. In operation, the gauge is calibrated to and operates from a first indicator state which indicates the desired normal state of the pressurized device. The first indicator state could be, for example, black. A pressure drop of about 3 psi to 5 psi below the normal state pressurized device pressure would result in the gauge proceeding to a second indicate state of, for example, yellow. Any additional pressure drop (or greater than 3 psi to 5 psi below the normal state pressurized device pressure) would result in the gauge proceeding to a third indicator state of, for example, red. The gauge of the present invention may contain any number of indicator states desired. The gauge can also include indicator states that show a pressure above a desired normal state by simply altering the order of the color bands associated with the indicator member. For example if the first indicator state was red, the second state was black and the third state was yellow, calibrating the gauge to the second state (black) will represent the first or normal state of the pressurized device. If the pressure increases, the next visual indication will be yellow, and if the pressure decreases the indicator will respond red.

While the gauges of the present invention have been described in detail with reference to specific embodiments thereof, it will be apparent to one skilled in the art that various changes and modifications can be made therein without departing from the spirit and scope thereof.

I claim:

1. A gauge comprising:
   a. a chamber adapted to be placed in fluid communication with a pressurized device;
   b. a converter operably associated with the chamber;
   c. a cylindrical rotary member coupled to the converter including an open-ended bottom, a closed-ended top, a side portion extending from top to bottom and an indicator pattern on the exterior surface of the side portion; and
   d. a cap covering the rotary member including an open-ended cap bottom, a closed-ended cap top, a cap side portion extending from top to bottom, a cylindrical inner surface co-axial with the exterior surface of the rotary member, and a plurality of windows having a width,
   where in response to a change in chamber pressure, the converter moves causing the rotary member to rotate relative to the cap windows changing an indicator state from a first state to a second state where the indicator state is viewable from the cap side.

2. The gauge of claim 1, wherein the pressure converter comprises a bourdon tube including an hermetically sealed end, an open end, and a twist where an interior of the tube is in fluid communication with the chamber at its open end, the sealed end is operatively connected to the rotary member, and a change in chamber pressure causes the tube to rotate the rotary member.

3. The gauge of claim 1, wherein the pressure converter comprises;
   i. a piston including a bottom surface and a top surface;
   ii. a track member having a twist angle attached to or integral with the top surface of the piston;
   iii. a follower member including a slit designed to slidingly engage and follow the track member and designed to be affixed to or be integral with the rotary member;
   iv. a flexible diaphragm sealingly engaging the chamber having a chamber side and a piston side where the piston side is affixed to the bottom surface of the piston, where the diaphragm is adapted to isolate the chamber from the piston, the track member, the follower member, the rotary member and the cap and where the diaphragm has a elastic resistance to deformation; and
   where a change in chamber pressure causes the piston and the track member to move up or down causing the follower member and the rotary member to rotate.

4. The gauge of claim 1, wherein the rotary member top includes a second indicator pattern and where the cap top includes at least one cap top window.

5. The gauge of claim 1, wherein the cap is adjustable for setting the gauge to the first indicator state.

6. The gauge of claim 1, the cap further including a plurality of masks having a mask width and pattern and wherein the indicator pattern comprises a plurality of marker patterns, each marker pattern having a marker pattern width.

7. The gauge of claim 6, wherein each marker pattern comprises a repeating sequence of bands, each band having a band width and pattern.

8. The gauge of claim 7, wherein a first band in the repeating sequence of bands has a first band pattern, a second band in the repeating sequence of bands has a second band pattern and a third band in the repeating sequence of bands has a third band pattern.

9. The gauge of claim 8, wherein the first band pattern is a first color, the second band pattern is a second color and the third band pattern is a third color.

10. The gauge of claim 1, wherein the indicator pattern comprises a plurality of a first marker pattern having a first marker width, a plurality of a second marker pattern having a second marker width and a plurality of a third marker pattern having a third marker width, and the cap window width is equal to the first marker width and the cap further including a plurality of masks having a mask width equal to the first marker width and a pattern equal to the first marker pattern.

11. The gauge of claim 6, wherein the patterns are solid colors.

12. The gauge of claim 1, wherein the gauge is a tire valve cap pressure gauge and the pressurized device is a tire.

13. The gauge of claim 1, wherein the converter comprises:
   i. a cylindrical cam including a cylindrical surface having at least one helical groove where the helical groove has a helical angle and adapted to engage at least one tab on an interior surface of the rotary member; and
   ii. a bias member comprising:
      (a) a spring having a spring constant interposed between a top of the cam and a bottom of the cap where the spring asserts a downward force on the cam; or
      (b) a flexible diaphragm sealingly engaging and isolating the chamber from the cam, the indicator and the cap, where the cam side of the diaphragm is affixed to a bottom of the cam and where the diaphragm has a elastic resistance to deformation.

14. The gauge of claim 13, wherein the spring constant and the helical angle or the elastic resistance to deformation and the helical angle cooperate so that a pressure change in the chamber between about 3 psi to about 5 psi results in a visual change in indicator state.

15. The gauge of claim 1, wherein the converter comprises:
   i. a cylindrical cam including a cylindrical surface having at least one helical groove where the helical groove has a helical angle and adapted to engage at least one tab on an interior surface of the rotary member;
   ii. a bias member comprising a spring having a spring constant interposed between a top of the cam and a bottom of the cap where the spring asserts a downward force on the cam; and
   iii. a flexible diaphragm sealingly engaging and isolating the chamber from the cam, the indicator and the cap, where the cam side of the diaphragm is in contact with a bottom of the cam.

16. The gauge of claim 15, wherein the diaphragm is inelastic.

17. The gauge of claim 16, wherein the spring constant and the helical angle cooperate so that a pressure change in the chamber between about 3 psi to about 5 psi results in a visual change in indicator state.

18. A method comprising the steps of:
   a. attaching to a pressurized device a gauge comprising:
      i. a chamber adapted to be placed in fluid communication with a pressurized device;
      ii. a converter operably associated with the chamber;
      iii. a cylindrical rotary member coupled to the converter including an open-ended bottom, a closed-ended top, a side portion extending from top to bottom and an indicator pattern on the exterior surface of the side portion; and
      iv. a cap covering the rotary member including an open-ended cap bottom, a closed-ended cap top, a cap side portion extending from top to bottom, a cylindrical inner surface co-axial with the exterior surface of the rotary member, and a plurality of windows where each window has a width,
   where in response to a change in chamber pressure, the converter moves causing the rotary member to rotate relative to the cap windows changing an indicator state from an initial state to a new state where the indicator state is viewable from the cap side.

19. The method of claim 18, further comprising the step of:
   b. rotating the cap to the initial state.

20. The method of claim 19, further comprising the step of:
   c. observing the new state.

* * * * *